United States Patent
Ishikawa et al.

(10) Patent No.: US 9,544,748 B2
(45) Date of Patent: Jan. 10, 2017

(54) TSUNAMI MONITORING RADAR SYSTEM INCLUDING TRANSMITTING ANTENNA FOR RADIATING TRANSMISSION SIGNAL FOR DETECTING TSUNAMI AS RADIO WAVE TOWARD SEA

(71) Applicant: MITSUBISHI ELECTRIC CORPORATION, Chiyoda-ku (JP)

(72) Inventors: Hiroaki Ishikawa, Chiyoda-ku (JP); Takashi Kawai, Chiyoda-ku (JP); Takafumi Nagano, Chiyoda-ku (JP); Taizo Isono, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/890,323

(22) PCT Filed: Jan. 23, 2014

(86) PCT No.: PCT/JP2014/051353
§ 371 (c)(1),
(2) Date: Nov. 10, 2015

(87) PCT Pub. No.: WO2014/192326
PCT Pub. Date: Dec. 4, 2014

(65) Prior Publication Data
US 2016/0157073 A1    Jun. 2, 2016

(30) Foreign Application Priority Data

May 31, 2013   (JP) ................................ 2013-115734

(51) Int. Cl.
*H04M 11/04* (2006.01)
*H04W 4/22* (2009.01)
(Continued)

(52) U.S. Cl.
CPC ................ *H04W 4/22* (2013.01); *G01C 13/00* (2013.01); *G01C 13/002* (2013.01); *G01S 13/50* (2013.01);
(Continued)

(58) Field of Classification Search
CPC ........ H04W 4/22; H04W 4/006; H04W 4/027; H04W 4/028; G01S 13/95; G01S 13/58; G01S 13/50; G01C 13/002; G01C 13/00; G08B 21/10
(Continued)

(56) References Cited

U.S. PATENT DOCUMENTS 6,018,244 A * 1/2000 Kushida ................. G01V 1/008
                                                        324/323
6,661,346 B1 * 12/2003 Wood ..................... G08B 21/10
                                                        340/601

(Continued)

FOREIGN PATENT DOCUMENTS

JP    07-218254 A    8/1995
JP    08-292273 A    11/1996
(Continued)

OTHER PUBLICATIONS

Office Action issued on Jun. 23, 2015 in Japanese Patent Application No. 2015-519687 with partial English translation.
(Continued)

*Primary Examiner* — Khai M Nguyen
(74) *Attorney, Agent, or Firm* — Oblon, McClelland, Maier & Neustadt, L.L.P.

(57) ABSTRACT

A tsunami monitoring system includes a transmitting antenna configured to radiate a transmission signal to detect a tsunami as a radio wave toward a sea, and a receiving antenna configured to receive reflected waves reflected by the tsunami as a receiving signal. The tsunami monitoring (Continued)

system includes a signal generator circuit configured to generate the transmission signal having a predetermined frequency, a signal processor portion configured to generate a beat signal of a frequency difference between the transmission signal and the receiving signal, and a wave height estimator portion configured to divide a radio wave radiation region into a plurality of regions, calculate a flow velocity of a sea surface of the tsunami for each region on the basis of the beat signal, and estimate a wave height of the tsunami from a calculated flow velocity.

11 Claims, 24 Drawing Sheets

(51) Int. Cl.
| | | |
|---|---|---|
| *G01S 13/95* | (2006.01) | |
| *G01S 13/58* | (2006.01) | |
| *G01C 13/00* | (2006.01) | |
| *G08B 21/10* | (2006.01) | |
| *G01S 13/50* | (2006.01) | |
| *H04W 4/00* | (2009.01) | |
| *H04W 4/02* | (2009.01) | |

(52) U.S. Cl.
CPC ............... *G01S 13/58* (2013.01); *G01S 13/95* (2013.01); *G08B 21/10* (2013.01); *H04W 4/006* (2013.01); *H04W 4/027* (2013.01); *H04W 4/028* (2013.01)

(58) Field of Classification Search
USPC .................................. 455/404.1, 404.2, 521
See application file for complete search history.

(56) References Cited

U.S. PATENT DOCUMENTS

| | | | | |
|---|---|---|---|---|
| 2007/0144242 | A1* | 6/2007 | Matsumiya ............ | G01V 1/008 73/82 |
| 2008/0021657 | A1* | 1/2008 | Barkal ................... | G01V 1/008 702/14 |
| 2008/0088500 | A1* | 4/2008 | Ishii ...................... | G01S 13/345 342/109 |
| 2013/0333483 | A1* | 12/2013 | Horoshenkov ..... | G01F 23/2962 73/861.25 |

FOREIGN PATENT DOCUMENTS

| | | | |
|---|---|---|---|
| JP | 2721486 B | | 3/1998 |
| JP | 11-201841 A | | 7/1999 |
| JP | 3512330 B | | 3/2004 |
| JP | 2006-209712 A | | 8/2006 |
| JP | 2007018291 A | * | 1/2007 |
| JP | 2007-248293 A | | 9/2007 |
| JP | 2009-229424 A | | 10/2009 |
| JP | 2010-175377 A | | 8/2010 |
| JP | 4534200 B | | 9/2010 |
| JP | 2013-040898 A | | 2/2013 |

OTHER PUBLICATIONS

Office Action issued on Sep. 15, 2015 in Japanese Patent Application No. 2015-519687 with partial English translation.

Office Action issued on Dec. 8, 2015 in Japanese Patent Application No. 2015-519687 with partial English translation.

Takashi Izumiya, et al., "Study on real-time prediction of tsunami using sea surface flow-velocity field by ocean radar", A collection of papers on Coastal Engineering, Japan Society of Civil Engineers, vol. 52, 2005, pp. 246-250.

Belinda J. Lipa., "HF Radar Detection of Tsunamis", Journal of Oceanography, vol. 62, No. 5, Oct. 2006, pp. 705-716.

International Preliminary Report on Patentability and Written Opinion issued Dec. 10, 2015 in PCT/JP2014/051353 filed Jan. 23, 2014 (submitting English translation only).

Koji Tokimatsu, Jishin Tsunami Hazard no Hyoka, Jan. 20, 2010, pp. 58-61.

Tomoyuki, Takahashi, "Application of Numerical Simulation to Tsunami Disaster Prevention" The Japan Society of Fluid Mechanics Suchi Ryutai Rikigaku Bumon Web Kaishi, Nov. 2004, vol. 12, No. 2, pp. 23-32.

Fumihiko Imamura, et al., "Tsunami Modelling Manual (Tunami model)", Apr. 2006, www.tsunami.civil.tohoku.ac.jp/hokusai3/J/projects/manual-ver-3.1.pdf.

Tomoyuki Takahashi, et al., "Mechanism of tsunami", Parity, vol. 26 , No. 11, Nov. 2011, pp. 34 to 41.

International Search Report issued on Mar. 11, 2014 for PCT/JP2014/051353 filed on Jan. 23, 2014.

* cited by examiner

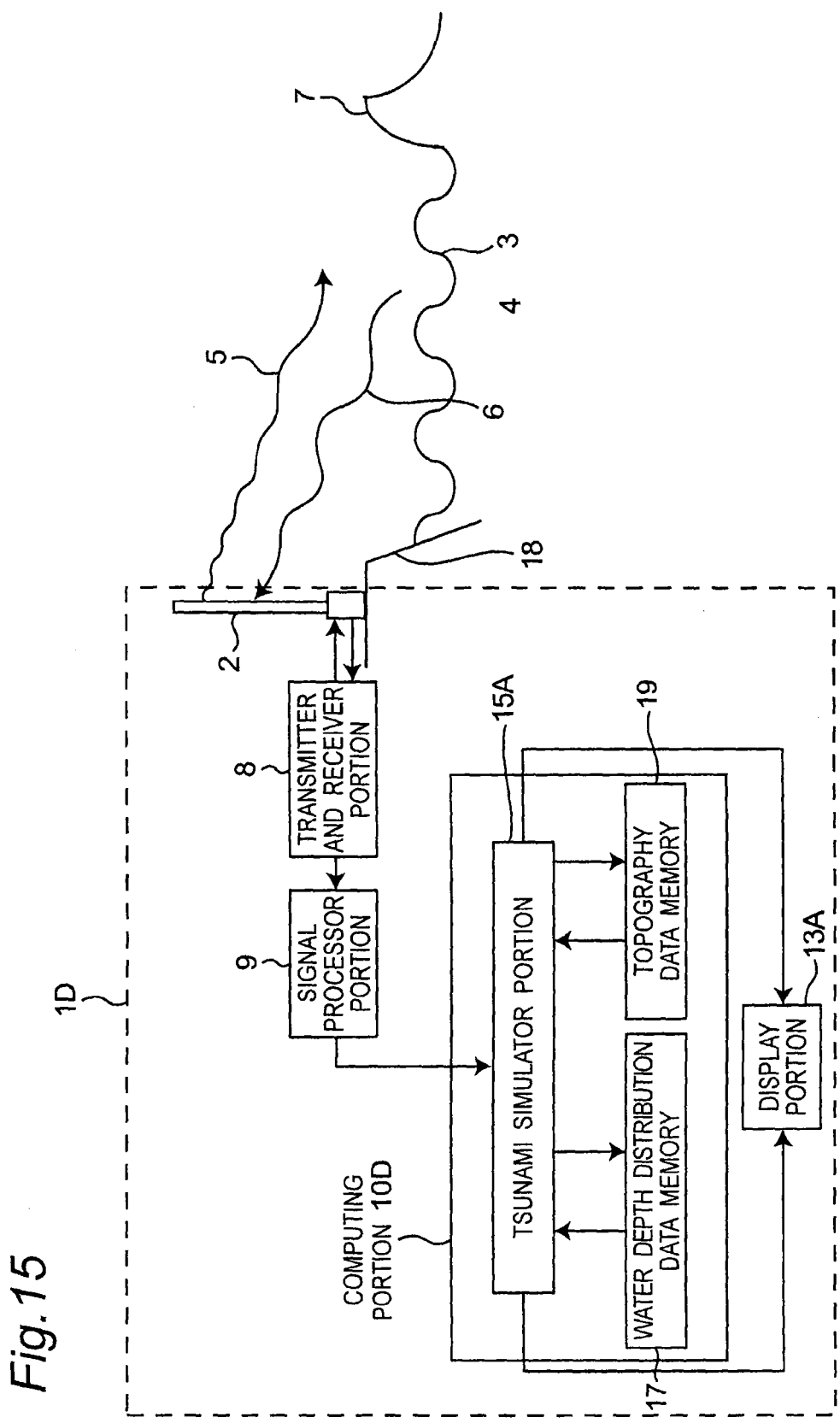

TSUNAMI MONITORING RADAR SYSTEM INCLUDING TRANSMITTING ANTENNA FOR RADIATING TRANSMISSION SIGNAL FOR DETECTING TSUNAMI AS RADIO WAVE TOWARD SEA

TECHNICAL FIELD

The present invention relates to a tsunami monitoring system for measuring a flow velocity of a sea surface of a tsunami by radar and predicting a wave height and arrival time to a land.

BACKGROUND ART

In recent years, it is concerned that a tsunami makes an incursion to a seacoast part of Japan due to an occurrence of a large earthquake. It is important to predict the arrival as early and accurate as possible in order to perform efficient evacuation behavior and handling before the tsunami arrives at the seacoast. Conventionally, several methods have been proposed to predict the arriving tsunami.

For example, according to a current tsunami forecast system in the Meteorological Agency, numerical simulations of tsunami are in advance performed by setting faults that possibly generates the tsunami, and the results are accumulated as a tsunami forecast database. When an earthquake actually occurs, prediction results corresponding to the location, scale and so on of the generated earthquake are retrieved from this database, and tsunami alarm or warning is announced (For example, see Patent Literature 1). However, since a location and a shift length of the fault necessary for predicting a magnitude of the generated tsunami are not accurately revealed when the earthquake occurs but subject to a data analysis at a later date, there has been a problem that large errors reside in the announced values of the magnitude, an arrival time and so on of the tsunami.

In addition, as another method, there is performed a trial to place a plurality of sensors such as buoys capable of measuring an arriving tsunami on and in the sea and to capture offshore the tsunami itself (For example, see Patent Literature 2). However, this method is able to only spatially obtain data of points, and therefore, this has been regarded insufficient to predict in detail a wave height and an arrival direction of the tsunami arriving in a wide range. Further, there has been such a problem that a large cost is necessary for securing a power source and a signal propagation path. In addition, sensors are necessary on and in the sea, and therefore, there has been such a problem that the maintenance of them are not easy.

Recently, in order to solve the aforementioned problems, tsunami monitoring with a marine radar is started (For example, see Patent Literature 3). The marine radar is able to measure ocean currents, ocean waves, ocean winds and so on in a wide region of about 100 km by radiating a radio wave from an antenna installed on a land toward the sea surface, receiving back-scattered waves due to the ocean waves at the sea surface and performing a frequency analysis. The marine radar has such a feature that a wide range can be observed at the same time, and the marine radar is suitable also for observation in a long term since observation can be performed from the land. However, the marine radar is able to measure only a sea surface flow velocity component in the line of sight of the radio wave radiated from the antenna and unable to directly measure a wave height of the arriving tsunami.

Therefore, in the tsunami monitoring system as described in Patent Literature 3, it is required to obtain a tsunami arrival time and prediction values of wave heights at nearby coasts from preliminarily prepared empirical rules of tsunami (e.g., wave height=flow velocity v×certain function F, arrival time T=distance/phase velocity and so on) on the basis of conditions of the measured flow velocity, terrain model and so on. It is required to construct in advance databases necessary for predicting tsunami characteristics from tsunami flow velocity patterns and to collate an obtained flow velocity distribution with these databases.

CITATION LIST

Patent Literature

Patent Literature 1: Japanese Patent Laid-open Publication No. JP2013-40898A
Patent Literature 2: Japanese Patent No. JP3512330B
Patent Literature 3: Japanese Patent No. JP2721486B
Patent Literature 4: Japanese Patent No. JP4534200B
Non-Patent Literature 1: Tomoyuki Takahashi, "Utilization of Computation in Tsunami Disaster Prevention", Web Journal of Japan Society of Computational Fluid Dynamics, November, 2004, Vol. 12, No. 2, pp. 23-32
Non-Patent Literature 2: F. Imamura, Ahmet Cevdet Yalciner and Gulizar Ozyurt, "TSUNAMI MODELLING MANUAL (TUNAMI model)", [online], April, 2006, [searched on Apr. 8, 2013], Internet<URL: http://www.t-sunami.civil.tohoku.ac.jp/hokusai3/J/projects/manual-ver-3.1.pdf>
Non-Patent Literature 3: Tomoyuki Takahashi, "Mechanism of tsunami", Parity, Vol. 26, No. 11, November, 2011, pp. 34-41

SUMMARY OF THE INVENTION

Technical Problem

However, since it is actually impossible to perform in advance simulations for all tsunami patterns in the tsunami monitoring system as described in Patent Literature 3, there has been such a problem that the tsunami cannot be predicted with sufficient accuracy. In addition, there has been such a problem that the accuracy is further deteriorated in an unexpected tsunami.

An object of the present invention is to solve the aforementioned problems and provide a tsunami monitoring system capable of directly predicting a wave height of an arriving tsunami with sufficient accuracy.

Solution to Problem

According to a tsunami monitoring system of the present invention, the tsunami monitoring system includes a transmitting antenna configured to radiate a transmission signal to detect a tsunami as a radio wave toward a sea, and a receiving antenna configured to receive reflected waves reflected by the tsunami as a receiving signal. The tsunami monitoring system includes signal generator means configured to generate the transmission signal having a predetermined frequency. The tsunami monitoring system includes a signal processor portion configured to generate a beat signal of a frequency difference between the transmission signal and the receiving signal. The tsunami monitoring system includes a wave height estimator portion configured to divide a radio wave radiation region into a plurality of regions, calculate a flow velocity of a sea surface of the tsunami for each region on the basis of the beat signal, and estimate a wave height of the tsunami from a calculated flow velocity.

Advantageous Effects of the Invention

According to the tsunami monitoring system of the present invention, the wave height of the tsunami can be directly predicted from the flow velocity distribution of the sea surface measured by the radio wave, and therefore, it is possible to highly accurately predict the arrival time and the arrival wave height of all tsunamis including unexpected tsunami.

BRIEF DESCRIPTION OF DRAWINGS

FIG. 15 is a block diagram showing a tsunami monitoring system 1D and its peripheral components, according to a sixth embodiment of the present invention.

DESCRIPTION OF EMBODIMENTS

Figure 1:
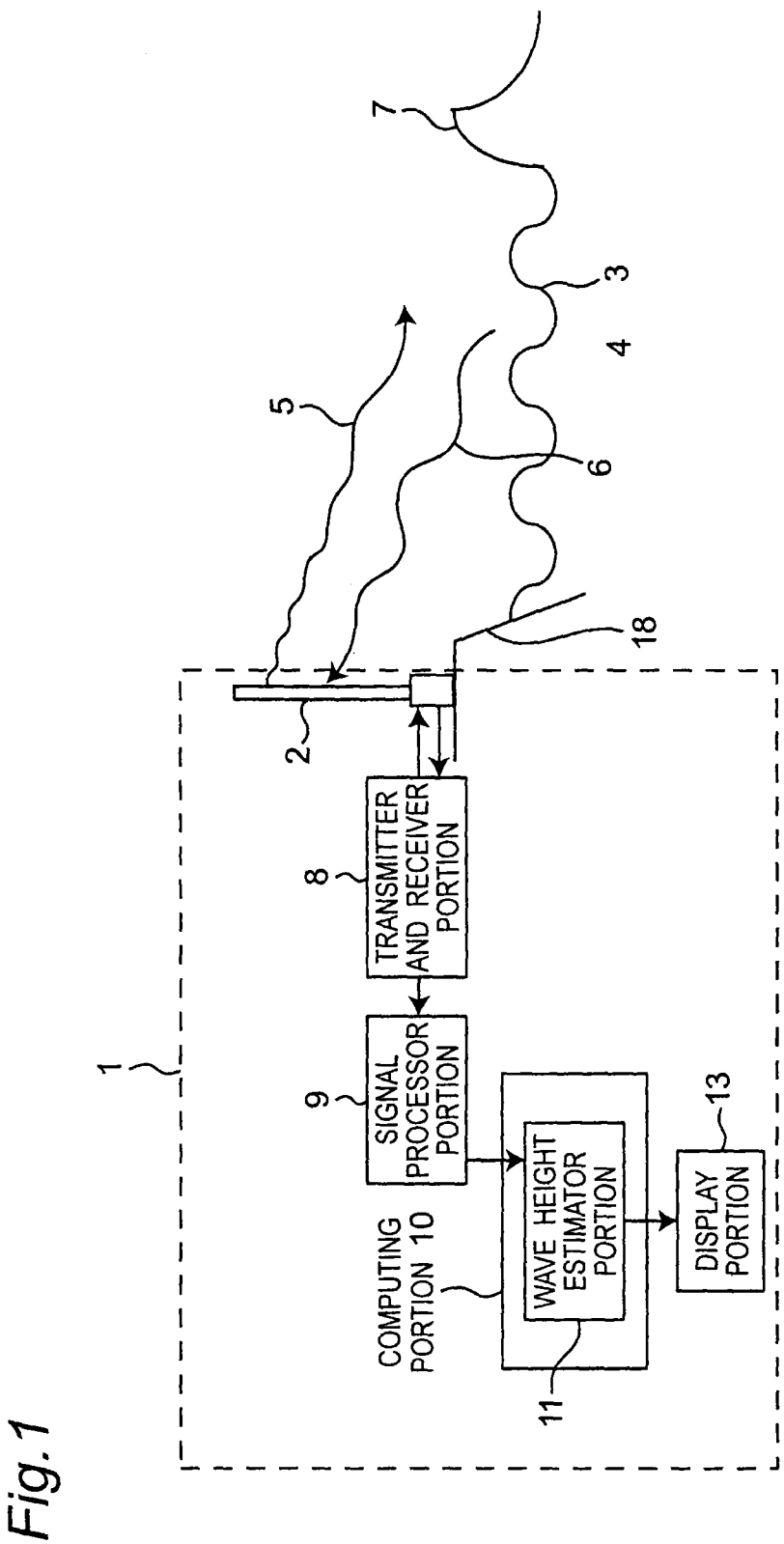
FIG. 1 is a block diagram showing a tsunami monitoring system 1 and its peripheral components, according to a first embodiment of the present invention.

Embodiments of the present invention will be described with reference to the drawings. In each of the following embodiments, like components are denoted by same reference numerals, and no description is provided for them.

First Embodiment

FIG. 1 is a block diagram showing a tsunami monitoring system 1 and its peripheral components, according to a first embodiment of the present invention. The tsunami monitoring system 1 of FIG. 1 is configured to include a transmitting and receiving antenna 2 provided in a position such that a transmission radio wave 5 can scan a sea surface, a transmitter and receiver portion 8, a signal processor portion 9, a computing portion 10, and a display portion 13. In addition, the computing portion 10 is configured to include a wave height estimator portion 11 configured to include a computer and a program. In addition, the transmitting and receiving antenna 2 is placed on a land 18. However, the invention is not limited thereto, the transmitting and receiving antenna 2 may be placed at any position such that the transmission radio wave 5 can scan the sea surface, for example, the transmitting and receiving antenna 2 may be placed on a sea 4. In addition, the transmitting and receiving antenna 2 has a cylindrical shape or a liner shape in FIG. 1. However, the invention is not limited thereto, the transmitting and receiving antenna 2 may be any type and have any shape so long as it can transmit and receive a radio wave. For example, the type of the transmitting and receiving antenna 2 may be an array antenna. Further, although the transmitting and receiving antenna 2 is constituted by integrating a transmitting antenna and a receiving antenna, a transmitting antenna and a receiving antenna may be provided separately.

The transmitter and receiver portion 8 includes signal generator means for generating a transmission signal having a predetermined frequency and outputting the transmission signal to the transmitting and receiving antenna 2. In addition, the transmitter and receiver portion 8 includes receiving means for receiving a receiving signal from the transmitting and receiving antenna 2 as described below and outputting the receiving signal to the signal processor portion 9. Although the transmitter and receiver portion 8 has been described as integrated in FIG. 1, there may be such a construction that a transmitting portion and a receiving portion are separated apart, and the present invention can be applied regardless of what constructions the transmitter and receiver portion 8 and the signal processor portion 9 have.

The transmitting and receiving antenna 2 radiates the transmission signal for detecting a tsunami 7 as the transmission radio wave 5 toward the sea. Further, the transmitting and receiving antenna 2 receives a receiving radio wave 6 intensely back-scattered on the sea surface 3 as the receiving signal, and outputs the receiving signal to the transmitter and receiver portion 8. It is noted that the backward scattering is called the Bragg scattering.

The signal processor portion 9 multiplies the transmission signal, which is generated by the transmitter and receiver portion 8, by the receiving signal, which is received by the transmitting and receiving antenna 2, and outputs a signal of a multiplication result as a beat signal to the wave height estimator portion 11. That is, the signal processor portion 9 generates the beat signal that has a frequency of the frequency difference between the transmission signal and the receiving signal. In this case, the receiving radio wave 6 is modulated by receiving a Doppler effect, and the amount of modulation depends on the flow velocity of the sea surface 3 and calculated as the beat signal. Further, the signal processor portion 9 has a function to remove higher harmonic components from the signal of the multiplication result of the transmission signal and the receiving signal by filtering.

The wave height estimator portion 11 receives the beat signal from the signal processor portion 9, calculates the flow velocity of the sea surface 3 of the tsunami 7 on the basis of the beat signal, estimates the wave height $\eta$ of the tsunami 7 from this flow velocity, and outputs data of an estimated wave height $\eta$ to the display portion 13. In this case, a radio wave radiation region 14 of the transmission radio wave 5 is divided into a plurality of regions as in FIG. 3 or the like as described below, the flow velocity of the sea surface 3 of the tsunami 7 is calculated for each region, and the wave height $\eta$ of the tsunami 7 in the region is estimated. In addition, the display portion 13 displays the data of the wave height $\eta$ inputted from the wave height estimator portion 11.

The operation of the wave height estimator portion 11 of the tsunami monitoring system 1 configured as above is described below.

Figure 2:
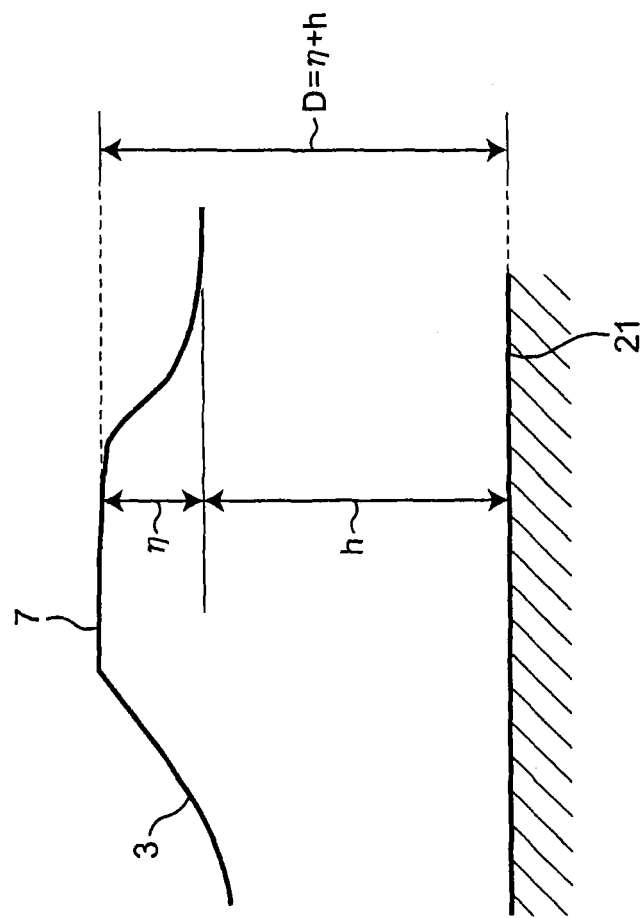
FIG. 2 is a sectional view for explaining a wave height η and a total water depth D of a tsunami 7 of FIG. 1.

FIG. 2 is a sectional view for explaining the wave height $\eta$ and a total water depth D of the tsunami 7 of FIG. 1. In FIG. 2, h represents a static water depth, and $\eta$ represents the wave height of the tsunami 7. It is noted that the static water depth h is a water depth from a sea bottom 21 to the sea surface 3 in case that a wave is not rising, and the wave height $\eta$ of the tsunami 7 is a water depth from the static water depth h to the sea surface 3 in case that the wave is rising. Therefore, the total water depth D from the sea bottom 21 to the sea surface 3 in case that the wave is rising becomes a sum of the wave height $\eta$ and the static water depth h. It is noted that the wavelength $\lambda$ of the tsunami 7 is generally sufficiently larger than the static water depth h ($h \ll \lambda$). Therefore, assuming that there are mutually orthogonal x axis, y axis and z axis, and the z axis is opposite to the direction of weight, then a behavior of the tsunami 7 can be expressed by a primitive equation (hereinafter referred to as the primitive equation of tsunami) of a long-wave theory configured to use the following mass conservation equation (1) and equations (2) and (3) of motion in the two-dimensional orthogonal coordinate system that has the x axis and the y axis (For example, see Non-Patent Literatures 1 and 2). The direction of weight is assumed to be orthogonal to the x-axis direction and the y-axis direction.

$$\frac{\partial \eta}{\partial t} + \frac{\partial M}{\partial x} + \frac{\partial N}{\partial y} = 0 \qquad (1)$$

$$\frac{\partial M}{\partial t} + \frac{\partial}{\partial x}\left(\frac{M^2}{D}\right) + \frac{\partial}{\partial y}\left(\frac{MN}{D}\right) + gD\frac{\partial \eta}{\partial x} + \frac{gn^2}{D^{\frac{7}{3}}}\left(M\sqrt{M^2+N^2}\right) = 0 \qquad (2)$$

$$\frac{\partial N}{\partial t} + \frac{\partial}{\partial x}\left(\frac{MN}{D}\right) + \frac{\partial}{\partial y}\left(\frac{N^2}{D}\right) + gD\frac{\partial \eta}{\partial y} + \frac{gn^2}{D^{\frac{7}{3}}}\left(N\sqrt{M^2+N^2}\right) = 0 \qquad (3)$$

In this case, $\eta$ is the wave height of the tsunami 7, M is a linear flow amount in the x-axis direction, N is a linear flow amount in the y-axis direction, n is a sea bottom friction coefficient (roughness coefficient of Manning), D is the total water depth ($D=h+\eta$ when the static water depth h and the wave height $\eta$ are used), t is time, and g is a gravitational acceleration.

According to the aforementioned long-wave theory, the flow velocity of the tsunami can be assumed to be approximately constant in a depth direction (z-axis direction), and therefore, a flow velocity U in the x-axis direction and a flow velocity V in the y-axis direction of the tsunami 7 are calculated as U=M/D and V=N/D, respectively. That is, the flow velocity U in the x-axis direction and the flow velocity V in the y-axis direction of the sea surface 3 measured by the tsunami monitoring system 1 are determined by the coordinates on the xy plane. Therefore, in the wave height estimator portion 12, the wave height $\eta$ can be calculated from the flow velocity U in the x-axis direction and the flow velocity V in the y-axis direction of the tsunami 7 measured by the tsunami monitoring system 1 on the basis of the aforementioned primitive equation of tsunami without database and empirical equation for correlating the flow velocity U in the x-axis direction and the flow velocity V in the y-axis direction with the wave height $\eta$ of the tsunami 7.

Figure 3:
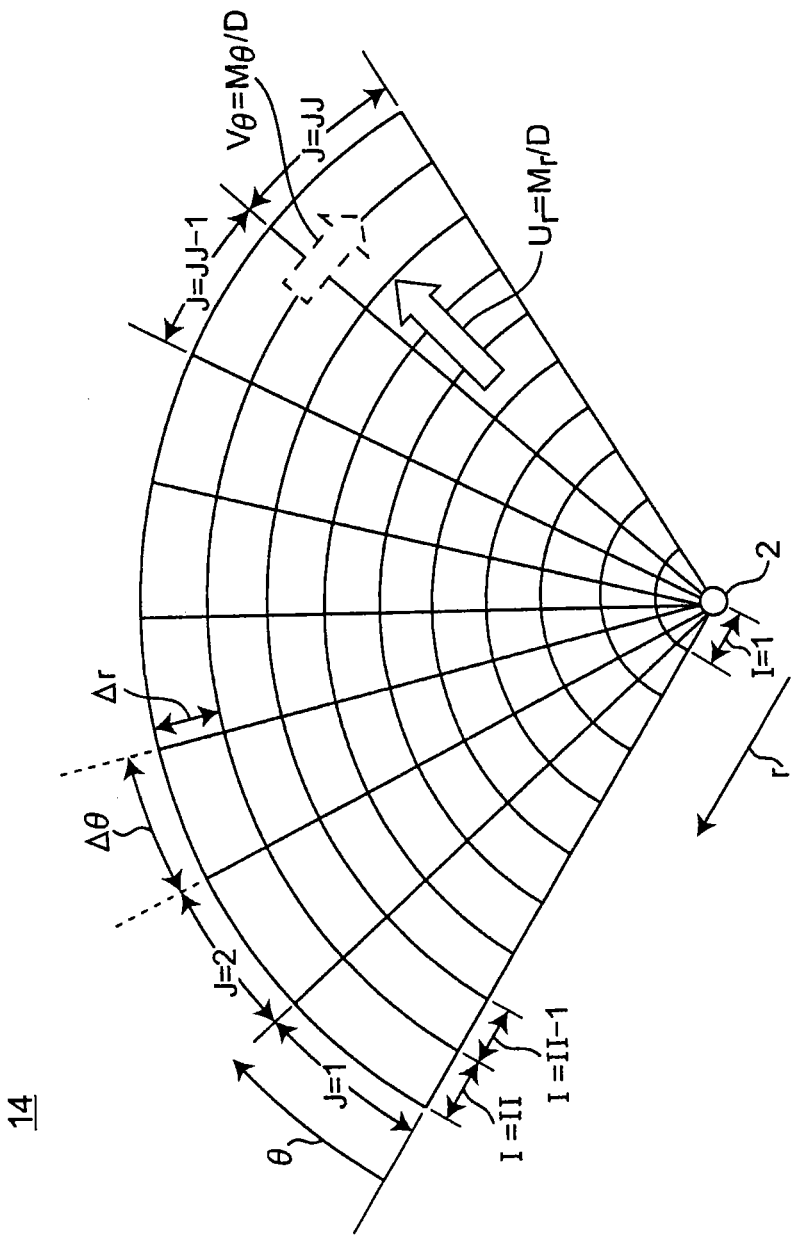
FIG. 3 is a plan view for explaining a radiation region of a transmission radio wave 5 emitted from a transmitting and receiving antenna 2 of FIG. 1.

FIG. 3 is a plan view for explaining a radiation region of the transmission radio wave 5 emitted from the transmitting and receiving antenna 2 of FIG. 1. Referring to FIG. 3, the transmission radio wave 5 from the transmitting and receiving antenna 2 is radiated to a sectorial radio wave radiation region 14 centered on the transmitting and receiving antenna 2. In this case, a place where the transmitting and receiving antenna 2 is installed is assumed as an origin (0, 0), and the radio wave radiation region 14 is divided into regions of number I=1 to II and J=1 to JJ at distance widths $\Delta r$ and angular widths $\Delta \theta$ by using a radius r from the origin (0, 0) and a clockwise rotational angle $\theta$ around the z axis. It is noted that the flow velocity in each region is measured as an average value at a constant sample time $\Delta t$. This sample time $\Delta t$, which varies depending on the processing time of the tsunami monitoring system 1 and the size and the like of the radio wave radiation region 14, is generally regarded to fall within a range of several tens of seconds to several minutes. In addition, it is generally regarded that the maximum value of the radius r of the radio wave radiation region 14 is several tens of meters to hundreds of kilometers, the distance width $\Delta r$ is not larger than several kilometers, and the angular width $\Delta \theta$ is not larger than 25 degrees. However, the maximum value of the radius r, the distance width $\Delta r$, and the angular width $\Delta \theta$ vary depending on measurement conditions, respectively. In addition, for simplicity in FIG. 3, although the distance width Δr and the angular width Δθ are constant, they may be varied in size according to the position of the radio wave radiation region 14, respectively.

In FIG. 3, a linear flow amount $M_r$ in the direction of the radius r and a linear flow amount $M_\theta$ in the direction of the rotational angle θ are calculated from the following equations:

$$M_r = U_r D$$

$$M_\theta = U_\theta D$$

In this case, $U_r$ is a measured flow velocity in the direction of the radius r, $U_\theta$ is a flow velocity in the direction of the rotational angle θ, and D is the total water depth.

In the present embodiment, only one transmitting and receiving antenna 2 for measuring the flow velocity $U_r$ in the direction of the radius r is installed. Therefore, only the flow velocity $U_r$ in the direction of the radius r is measured without measuring the flow velocity $U_\theta$ in the direction of the rotational angle θ. It is noted that the equation (5) for calculating the wave height η of the tsunami 7 by using the flow velocity $U_r$ in the direction of the radius r is derived as follows from the aforementioned primitive equation of tsunami.

First of all, the aforementioned equation (2) of motion is converted into a cylindrical coordinate system to eliminate the component in the direction of the rotational angle θ. Next, assuming that the dimension of the wave height η is sufficiently small as compared with the dimension of the total water depth D, then the dimension of the total water depth D becomes roughly equal to the dimension of the static water depth h, and therefore, the following equation (4) is derived, i.e., when D=h is substituted into the above deformed equation of motion:

$$\frac{\partial M_r}{\partial t} + \frac{\partial}{\partial r}\left(\frac{M_r^2}{h}\right) + gh\frac{\partial \eta}{\partial r} + \frac{gn^2}{h^{\frac{7}{3}}} M_r^2 = 0 \qquad (4)$$

Next, assuming that the static water depth h is sufficiently large and $M_r = U_r D \approx U_r h$, the following equation (5) can be derived by simplifying and arranging the equation (4). By solving this equation (5), the wave height η of the tsunami 7 can be calculated from the flow velocity $U_r$ in the direction of the radius r:

$$\frac{\partial \eta}{\partial r} = -\frac{1}{g}\frac{\partial U_r}{\partial t} \qquad (5)$$

In this case, the right-hand side of the equation (5) is a time variation of the flow velocity $U_r$ in the direction of the radius r, and it can be calculated by using the two values of the flow velocity $U_r$ in the direction of the radius r measured by the tsunami monitoring system 1 at time t and time (t−Δt).

By solving the aforementioned equation (5) by using a numerical analysis method such as a calculus of finite difference, the distribution of the wave height η of the tsunami 7 in the radio wave radiation region 14 of FIG. 3 can be calculated. In this case, the distribution of the wave height η of the tsunami 7 can be calculated by sequentially solving the following equation (6) differenced in the region of FIG. 3 for all the regions of I=1 to II and J=1 to JJ:

$$\eta(I+1, J)^k = \eta(I, J)^k - \left(\frac{\Delta r}{\Delta t}\right)\frac{1}{g}(U_r(I, J)^k - U_r(I, J)^{k-1}) \qquad (6)$$

In this case, k means a value corresponding to time t, and (k−1) means a value corresponding to time (t−Δt).

It is noted that the difference formula of the aforementioned equation (6) is one example, and another method may be used if the equation (5) is numerically solved with regard to the wave height η, and the wave height η of the tsunami 7 can be calculated in all the regions of I=1 to II and J=1 to JJ.

According to the tsunami monitoring system 1 of the above embodiment, the wave height of the tsunami can be predicted directly from the flow velocity distribution of the sea surface measured by the radio wave, and therefore, it is possible to accurately predict the arrival time and the arrival wave height of all tsunamis including the unexpected tsunami.

Second Embodiment

Figure 4:
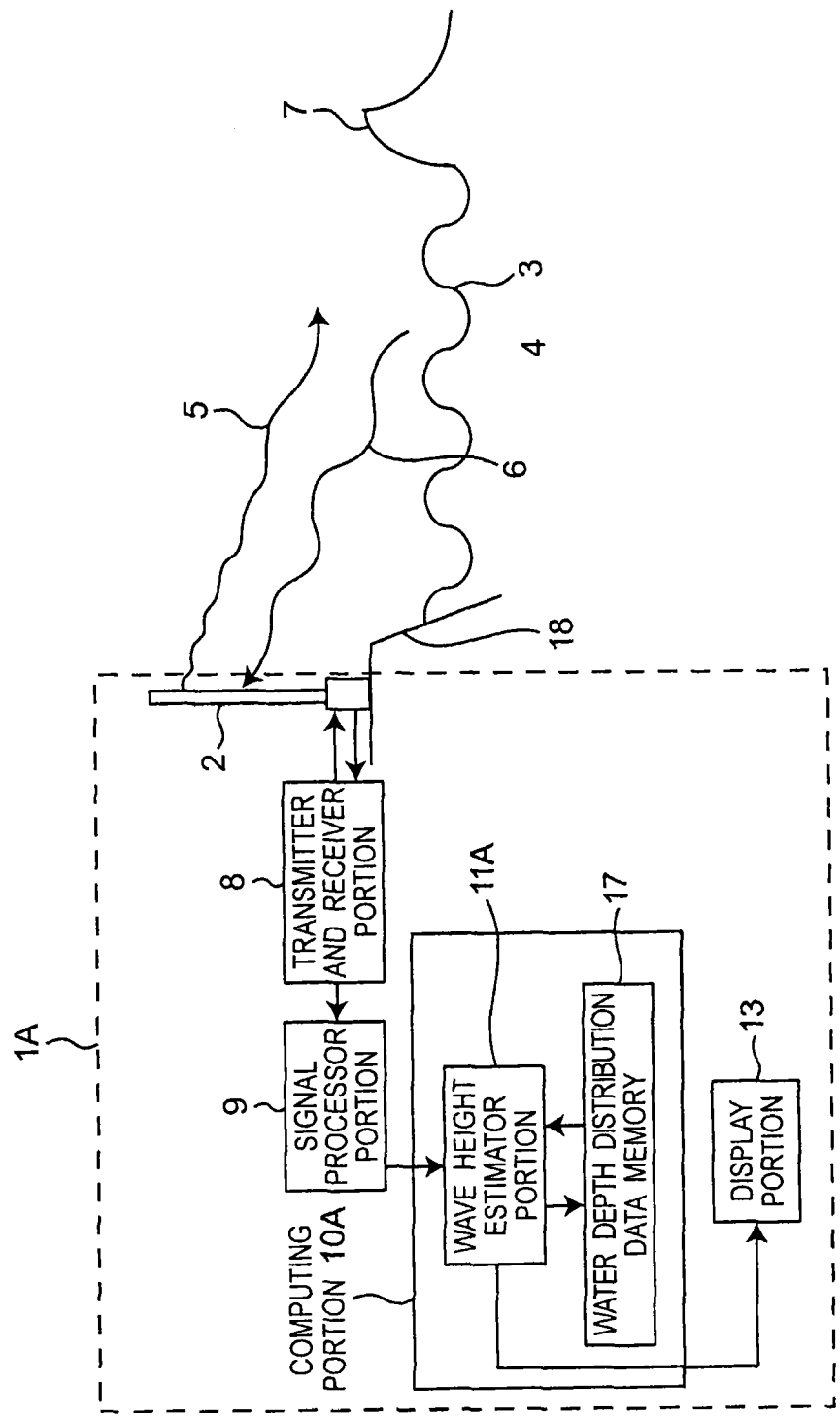
FIG. 4 is a block diagram showing a tsunami monitoring system 1A and its peripheral components, according to a second embodiment of the present invention.

FIG. 4 is a block diagram showing a tsunami monitoring system 1A and its peripheral components, according to a second embodiment of the present invention. As compared with the tsunami monitoring system 1 of FIG. 1, the tsunami monitoring system 1A of FIG. 4 is characterized in that a computing portion 10A is provided in place of the computing portion 10.

In addition, as compared with the computing portion 10 of FIG. 1, the computing portion 10A is characterized in that a wave height estimator portion 11A is provided in place of the wave height estimator portion 11 and a water depth distribution data memory 17 of a first memory for storing the water depth distribution data of the static water depth h of the sea 4 around the transmitting and receiving antenna 2 is further provided. In this case, although a range around the transmitting and receiving antenna 2 is arbitrarily determined depending on the range in which the transmission radio wave 5 can scan the sea surface or the like, the range around the transmitting and receiving antenna 2 is generally regarded to be a range of several tens of kilometers to several hundreds of kilometers.

The wave height estimator portion 11A receives a beat signal from the signal processor portion 9, calculates the flow velocity of the sea surface 3 of the tsunami 7 on the basis of the beat signal, estimates the wave height η of the tsunami 7 on the basis of the data of the flow velocity and the distribution data of the static water depth h of the sea 4 stored in the water depth distribution data memory 17, and outputs the data of a estimated wave height η to the display portion 13.

The operation of the wave height estimator portion 11A of the tsunami monitoring system 1A configured as above is described below.

Assuming that the static water depth h is sufficiently large and $M_r = U_r D \approx U_r h$, the equation (5) of the first embodiment can be simplified, and therefore, there is such a merit that the calculation load becomes small. However, the wave height η of the tsunami 7 can be estimated more accurately by comparison to the first embodiment according to the following equation (7) corresponding to the equation (5) without simplification like this.

$$\frac{\partial \eta}{\partial r} = \frac{1}{gh}\left\{-\frac{\partial}{\partial r}\left(\frac{M_r^2}{h}\right) - \frac{gn^2}{h^{\frac{7}{3}}}M_r^2 - \frac{\partial M_r}{\partial t}\right\} \quad (7)$$

In this case, the linear flow amount $M_r$ in the direction of the radius r is obtained as $M_r = U_r D \approx U_r h$ by using the measured flow velocity $U_r$ in the direction of the radius r. It is noted that the distribution data of the static water depth h is read out from the water depth distribution data memory 17.

The aforementioned equation (7) is able to calculate the distribution of the wave height $\eta$ of the tsunami 7 in the radio wave radiation region 14 of FIG. 3 by being solved by a method similar to that of, for example, the equation (5) of the first embodiment. In this case, the wave height $\eta$ of the tsunami 7 can be estimated more accurately by comparison to the tsunami monitoring system 1 of the first embodiment.

Although the aforementioned equation (7) has calculated the wave height $\eta$ by using the time variation of the linear flow amount $M_r$ in the direction of the radius r, the invention is not limited thereto. For example, assuming that the wave height $\eta$ of the tsunami is sufficiently smaller than the static water depth h, the distribution of the wave height $\eta$ may be calculated by the following equation (7B) by using a wave velocity C of the tsunami expressed by the following equation (7A) (See Patent Literature 4):

$$C = \sqrt{gh} \quad (7A)$$

$$\eta = \frac{U_r}{C}h = U_r\sqrt{\frac{h}{g}} \quad (7B)$$

If the wave height distribution is calculated by using the aforementioned equation (7B), the wave height $\eta$ can be obtained from only the flow velocity $U_r$ and the static water depth h at one spot at one time. Therefore, the distribution of the wave height $\eta$ of the tsunami 7 in the radio wave radiation region 14 of FIG. 3 can be calculated without using the numerical analysis method of, for example, the difference method, and therefore, it is possible to calculate the distribution of the wave height $\eta$ in shorter time. It is noted that any equation may be used so long as the wave height $\eta$ of the tsunami 7 can be estimated on the basis of the flow velocity of the sea surface 3 of the tsunami 7 and the distribution data of the static water depth h of the sea 4.

According to the tsunami monitoring system 1A of the above embodiment, the arrival time and the arrival wave height of the tsunami can be predicted more accurately by comparison to the first embodiment.

Third Embodiment

The case where only the transmitting and receiving antenna 2 for measuring flow velocity $U_r$ in the direction of the radius r is installed has been described in the second embodiment, it becomes possible to more accurately estimate the wave height $\eta$ of the tsunami 7 by further installing a transmitting and receiving antenna 2 for measuring the flow velocity $V_\theta$ in the direction of the rotational angle $\theta$.

When the equations (2) and (3) of motion of the first embodiment are deformed and the dimension of the wave height $\eta$ is assumed to be sufficiently small by comparison to the dimension of the total water depth D, then the following equation (8) and equation (9) are derived when D=h is substituted into the above deformed equation of motion and orderly arranged since the dimension of the total water depth D is approximately equal to the dimension of the static water depth h:

$$\frac{\partial M_r}{\partial t} + gh\frac{\partial \eta}{\partial r} = 0 \quad (8)$$

$$\frac{\partial M_\theta}{\partial t} + gh\frac{1}{r}\frac{\partial \eta}{\partial \theta} = 0 \quad (9)$$

Next, when the equation (8) differentiated by the radius r and the equation (9) differentiated by the rotational angle $\theta$ are added together, then the equation (10) for estimating the wave height $\eta$ of the tsunami 7 is derived.

$$\frac{\partial^2 \eta}{\partial r^2} + \frac{1}{r^2}\frac{\partial^2 \eta}{\partial \theta^2} + \frac{1}{h}\left(\frac{\partial h}{\partial r}\frac{\partial \eta}{\partial r} + \frac{1}{r^2}\frac{\partial h}{\partial \theta}\frac{\partial \eta}{\partial \theta}\right) = -\frac{1}{gh}\left\{\frac{\partial}{\partial r}\left(\frac{\partial M_r}{\partial t}\right) + \frac{1}{r}\frac{\partial}{\partial \theta}\left(\frac{\partial M_\theta}{\partial t}\right)\right\} \quad (10)$$

Next, by solving the equation (10) by a method similar to that of, for example, the equation (5), the distribution of the wave height $\eta$ of the tsunami 7 in the radio wave radiation region 14 of FIG. 3 can be calculated. In this case, the right-hand side is obtained from the flow velocity $U_r$ in the direction of the radius r and the flow velocity $V_\theta$ in the direction of the rotational angle $\theta$ at two times measured by the aforementioned two transmitting and receiving antennas 2, and the static water depth h is obtained from the water depth distribution data 17 of FIG. 4.

Figure 5:
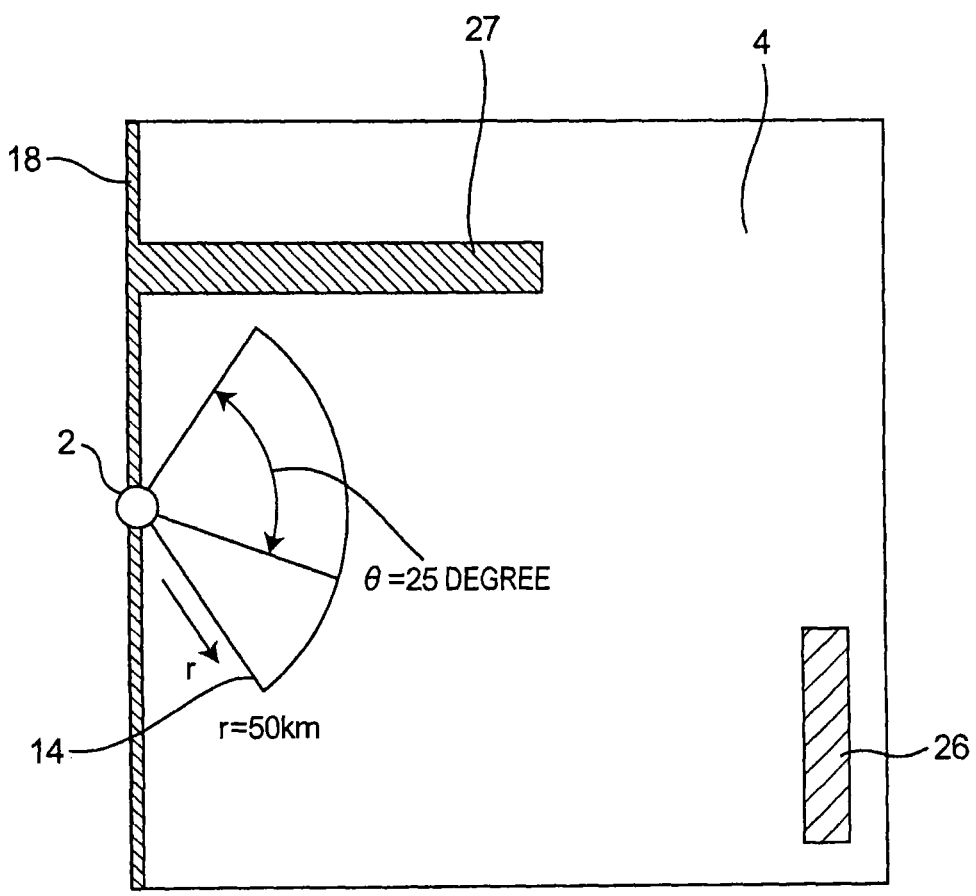
FIG. 5 is a plan view for explaining a region in which the wave height η of the tsunami 7 of FIG. 2 is simulated.

FIG. 5 is a plan view for explaining a region in which the behavior of the tsunami 7 of FIG. 2 is simulated. Referring to FIG. 5, one transmitting and receiving antenna 2 is installed on the land 18, and a bund 27 is projecting from the land 18. In this case, as initial conditions for simulating the behavior of the tsunami 7 propagating in accordance with a lapse of time, there was setting such that the tsunami 7 of the wave height $\eta$ was generated in the region 26, and a time interval $\Delta t$ necessary for wave height estimation was set to be 60 seconds by using only the flow velocity $U_r$ in the direction of the radius r, which is component in the line of sight of the transmitting and receiving antenna 2.

Next, the result of the wave height $\eta$ distribution estimated by the method of the present embodiment was compared with that of the wave height $\eta$ distribution calculated by the tsunami simulation of Non-Patent Literature 2. This comparison results are described below.

Figure 6A:
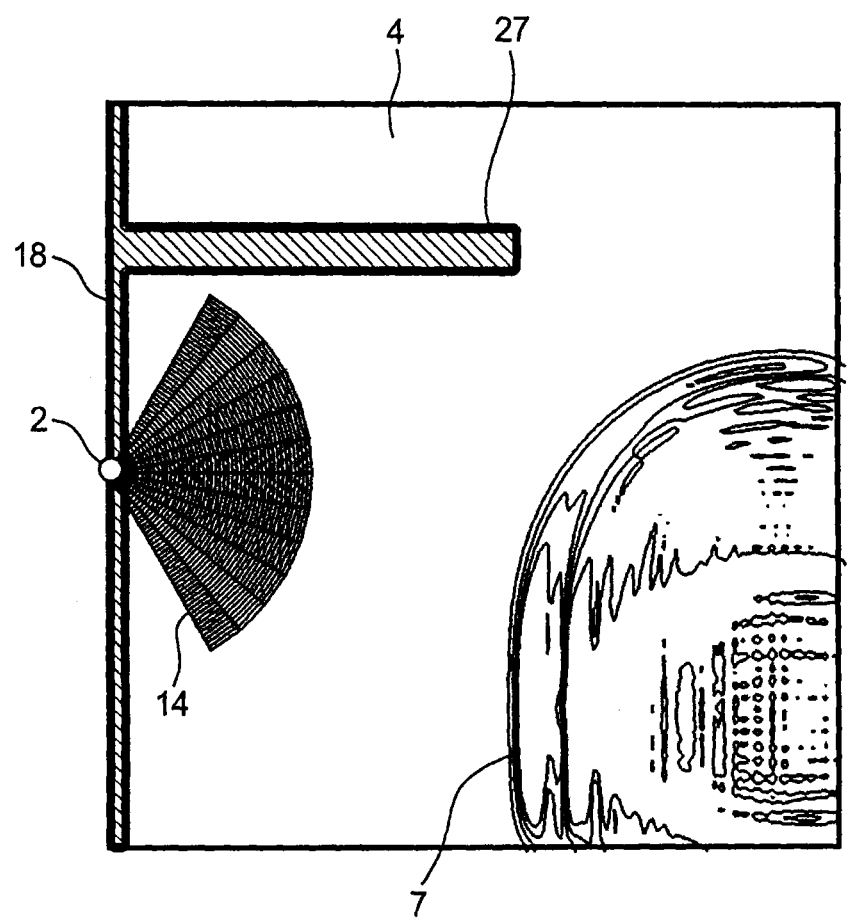
FIG. 6A is a plan view showing results of simulating the wave height η of FIG. 5 after ten minutes.
Figure 6B:
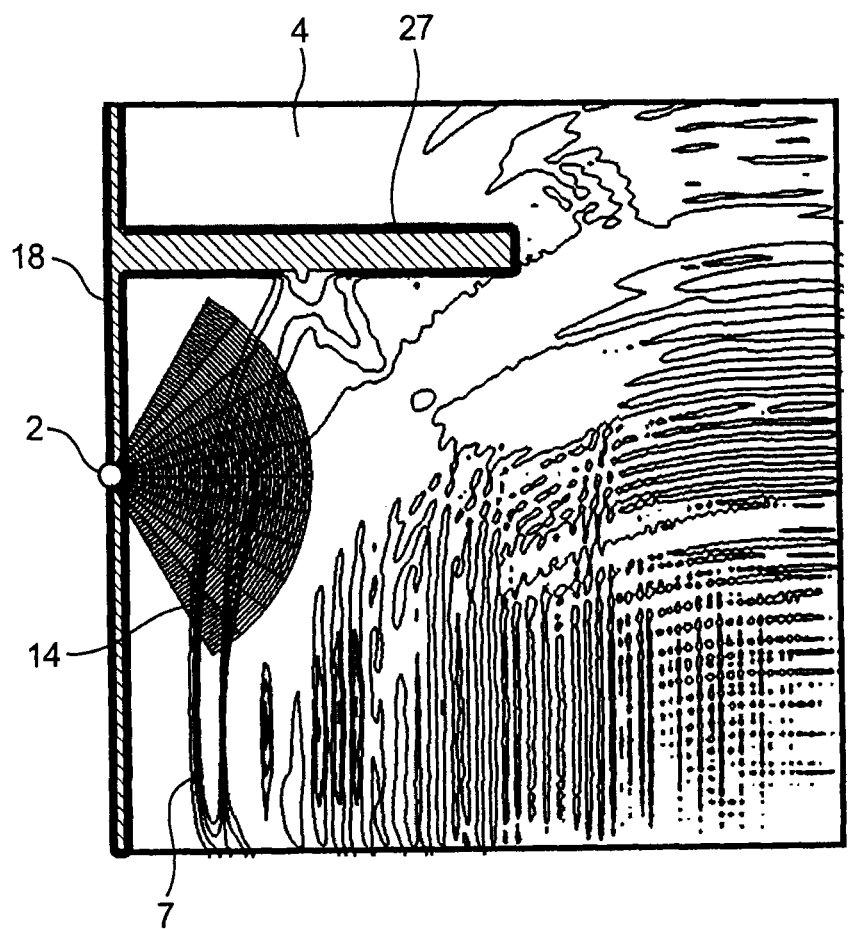
FIG. 6B is a plan view showing results of simulating the wave height η of FIG. 5 after 25 minutes.

FIG. 6A is a plan view showing results of simulating the behavior of the tsunami 7 of FIG. 5 after ten minutes. In addition, FIG. 6B is a plan view showing the result of simulating the behavior of the tsunami 7 of FIG. 5 after 25 minutes. In FIGS. 6A and 6B, the wave height $\eta$ distribution change of the tsunami 7 with respect to time are illustrated, and the tsunami 7 arrives at the inside of the radio wave radiation region 14 after 25 minutes.

Figure 7A:
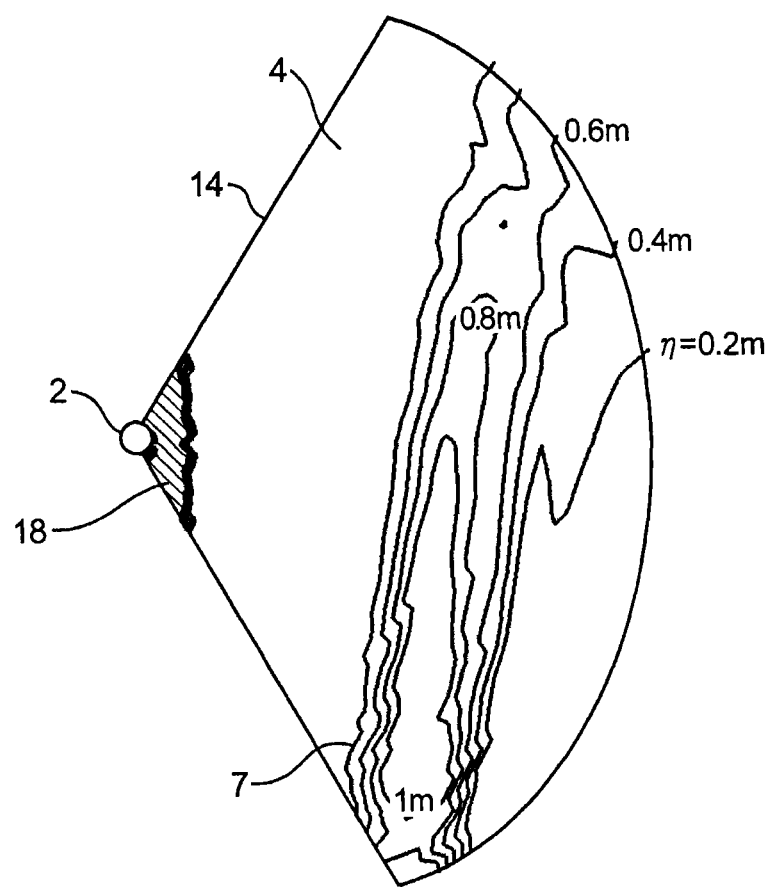
FIG. 7A is a plan view showing a distribution of the wave height η of FIG. 5 after 25 minutes.
Figure 7B:
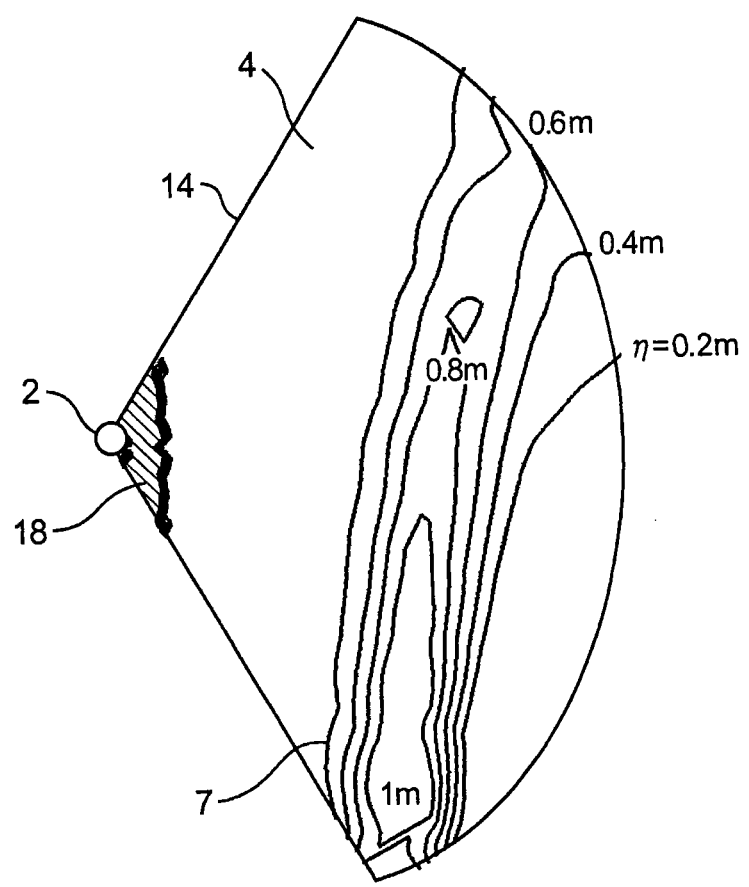
FIG. 7B is a plan view showing a distribution of the wave height η of the tsunami 7 of FIG. 5 after 25 minutes generated by the tsunami monitoring system 1A of FIG. 4.

FIG. 7A is a plan view showing a distribution of the wave height $\eta$ of FIG. 5 after 25 minutes. In addition, FIG. 7B is a plan view showing the distribution of the wave height $\eta$ of the tsunami 7 of FIG. 5 after 25 minutes generated by the tsunami monitoring system 1A of FIG. 4. In FIGS. 7A and 7B, the tsunami simulation results are compared with the wave height estimation results calculated by the tsunami monitoring system 1A. In this case, the wave height distribution of the tsunami 7 in the radio wave radiation region 14 after 25 minutes from the occurrence of the tsunami 7 is illustrated, it can be understood that the wave height estimation results calculated by the tsunami monitoring system 1A coincide comparatively well with the tsunami simulation results of Non-Patent Literature 2.

Figure 8:
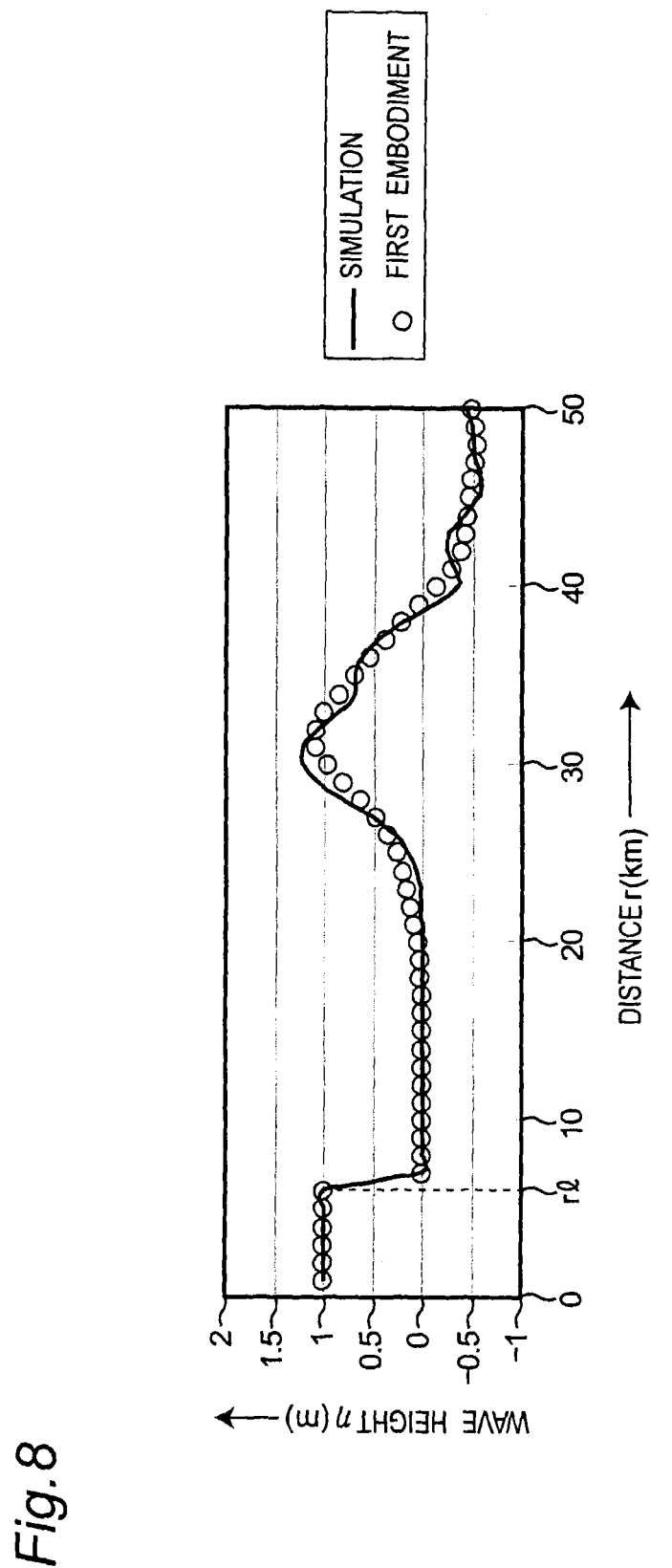
FIG. 8 is a graph showing changes in the wave height η of the tsunami 7 of FIG. 7A and FIG. 7B with respect to a radius r from a transmitting and receiving antenna 2.

FIG. 8 is a graph showing changes in the wave height η of the tsunami 7 of FIG. 7A and FIG. 7B with respect to the radius r from the transmitting and receiving antenna 2. In FIG. 8, the tsunami simulation results in the direction of the radius r are compared with the wave height estimation results. In this case, the distribution of the wave height in the radial direction on the line of a rotational angle θ=25 degrees in FIG. 5. The wave height estimation results calculated by the tsunami monitoring system 1A coincide well with the tsunami simulation results of Non-Patent Literature 2, and the advantageous effects of the present embodiment can be confirmed.

As described above, the estimation of the distribution of the wave height η of the tsunami 7 may be performed by formula deformation by a method other than the aforementioned method so long as it is derived from the primitive equation of tsunami based on the long-wave theory. For example, in case that the transmitting and receiving antenna only 2 for measuring the flow velocity $U_r$ in the direction of the radius r is only installed, it is acceptable to eliminate component in the rotational angle θ direction from the equation (10) and to use the following equation (11) in place of the aforementioned equation (5) and the equation (7).

$$\frac{\partial^2 \eta}{\partial r^2} + \frac{1}{h}\left(\frac{\partial h}{\partial r}\frac{\partial \eta}{\partial r}\right) = -\frac{1}{gh}\left\{\frac{\partial}{\partial r}\left(\frac{\partial M_r}{\partial t}\right)\right\} \quad (11)$$

According to the tsunami monitoring system 1 of the above embodiment, the arrival time and the arrival wave height of the tsunami can be predicted more accurately by comparison to the second embodiment.

Fourth Embodiment

Figure 9:
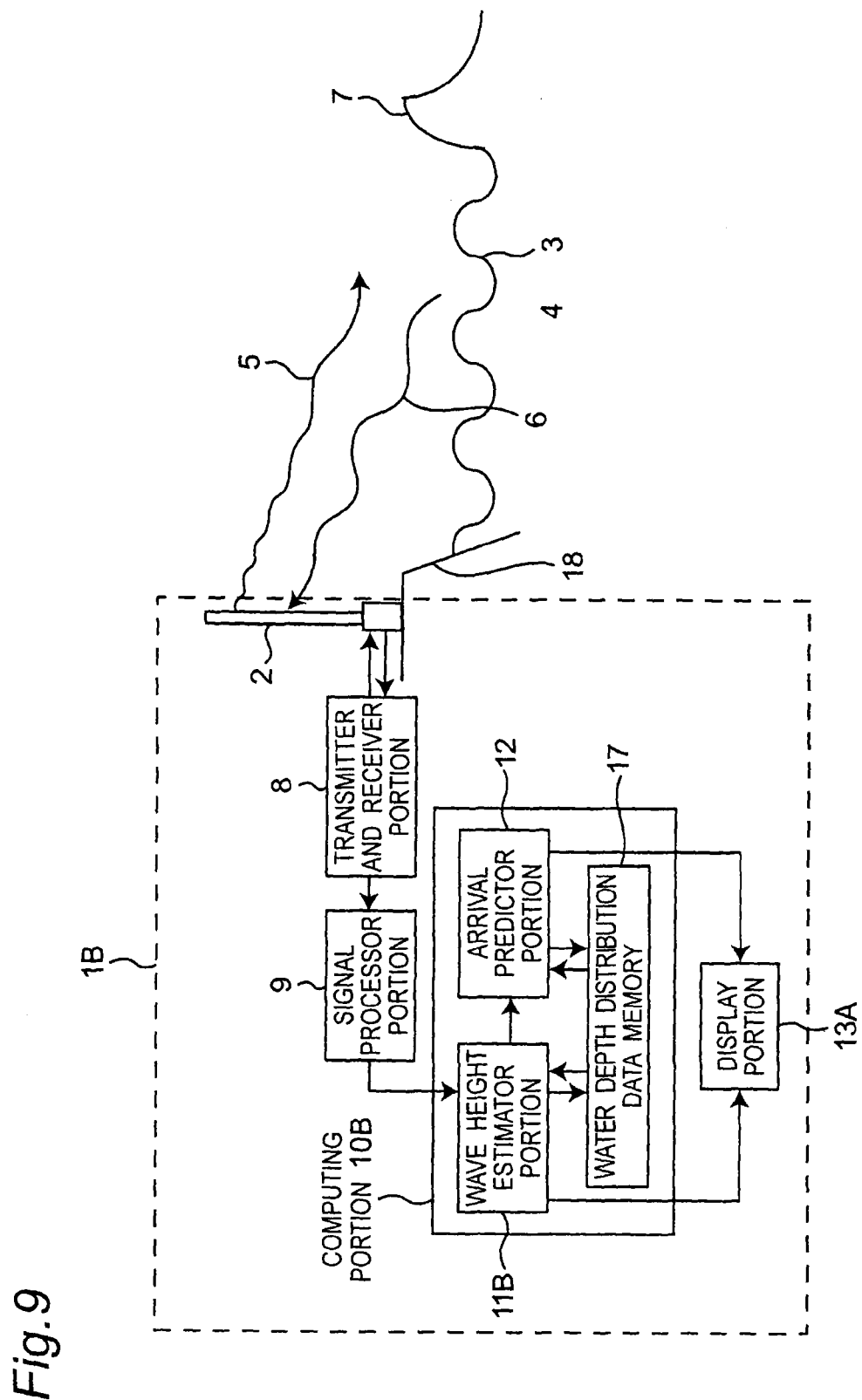
FIG. 9 is a block diagram showing a tsunami monitoring system 1B and its peripheral components, according to a fourth embodiment of the present invention.

FIG. 9 is a block diagram showing a tsunami monitoring system 1B and its peripheral components, according to the fourth embodiment of the present invention. As compared with the tsunami monitoring system 1A of FIG. 4, the tsunami monitoring system 1B of FIG. 9 is characterized in that a computing portion 10B is provided in place of the computing portion 10A, and a display portion 13A is provided in place of the display portion 13. In addition, as compared with the computing portion 10A, the computing portion 10B is characterized in that a wave height estimator portion 11B is provided in place of the wave height estimator portion 11A, and an arrival predictor portion 12 that predicts the arrival time and the arrival wave height η of the tsunami 7 is further provided. Further, the arrival predictor portion 12 is configured to include a computer and a program.

The wave height estimator portion 11B receives a beat signal from the signal processor portion 9, calculates the flow velocity of the sea surface 3 of the tsunami 7 on the basis of the beat signal, estimates the wave height η of the tsunami 7 on the basis of this flow velocity and the distribution data of the static water depth h of the sea 4 stored in the water depth distribution data memory 17, and outputs the data of the estimated wave height η to the display portion 13 and the arrival predictor portion 12.

The arrival predictor portion 12 receives an input of the data of the wave height η from the wave height estimator portion 11B, predicts the arrival time and the arrival wave height of the tsunami 7 of which the wave height η has been estimated on the basis of the data of the wave height η and the distribution data of the static water depth h stored in the water depth distribution data memory 17, and outputs the data of the predicted arrival time and arrival wave height to the display portion 13A. In addition, the display portion 13A displays the data of the wave height η inputted from the wave height estimator portion 11A and the data of the predicted arrival time and arrival wave height inputted from the arrival predictor portion 12.

Operation of the arrival predictor portion 12 of the tsunami monitoring system 1B constructed as above is described below.

First of all, the arrival time of the tsunami 7 is predicted by using the following equation (12) that represents the wave velocity C of the tsunami 7 (see Patent Literature 4).

$$C = \sqrt{gh} \quad (12)$$

In this case, the wave velocity C of the tsunami 7 depends only on the static water depth h.

Figure 10:
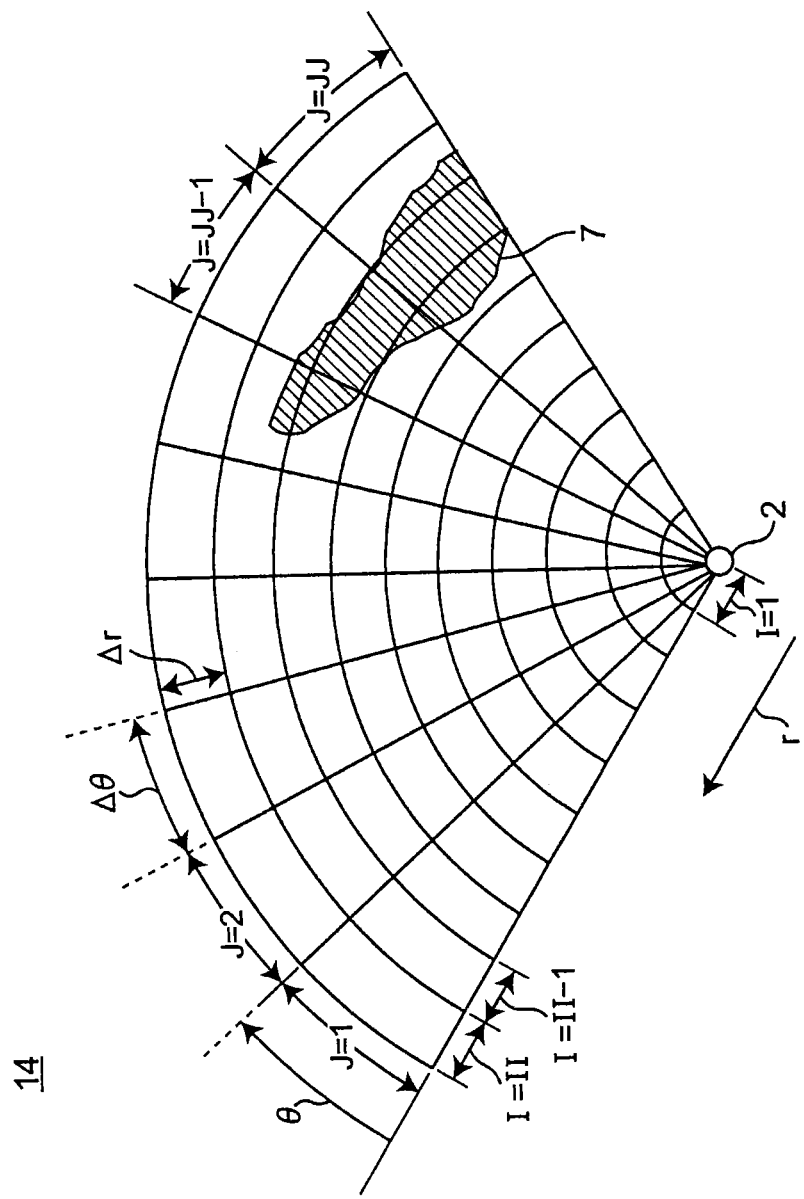
FIG. 10 is a plan view showing such a state that the wave height η of the tsunami 7 is estimated by using the tsunami monitoring system 1B of FIG. 9.

FIG. 10 is a plan view showing such a state that the wave height η of the tsunami 7 is estimated by using the tsunami monitoring system 1B of FIG. 9. In FIG. 10, the wave height distribution estimated by the wave height estimator portion 11A is illustrated, and the arrival time when the tsunami 7 whose wave height distribution has been estimated arrives at the installation position of the transmitting and receiving antenna 2 is predicted. In this case, the tsunami 7 is assumed to progress in the direction toward the transmitting and receiving antenna 2 after being detected.

In FIG. 10, the arrival time can be calculated by calculating the wave velocity C of the tsunami 7 by using the water depth distribution data 17 in the direction of the radius r from the transmitting and receiving antenna 2 and the equation (12) with regard to each region of J in the direction of the rotational angle θ along the circumferential direction of the sectorial radio wave radiation region 14, and performing integration until a distance between the tsunami 7 and the transmitting and receiving antenna 2 becomes zero.

Figure 11:
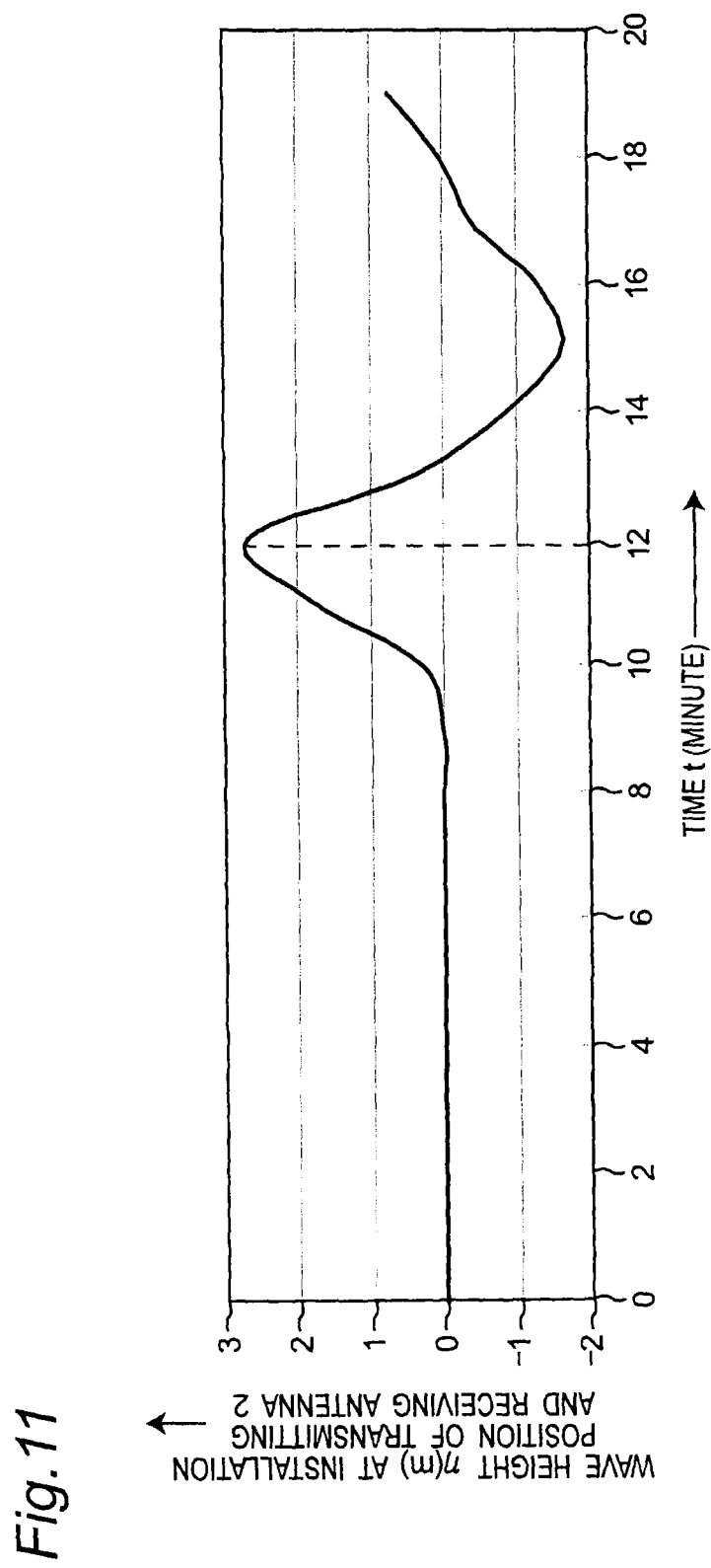
FIG. 11 is a time base waveform chart showing a result of simulating changes in the wave height η at an installation position of the transmitting and receiving antenna 2 with respect to time t.

FIG. 11 is a time base waveform chart showing the result of simulating the change in the wave height η at the installation position of the transmitting and receiving antenna 2 with respect to time t. In this case, a time variation of the water level at the installation position of the transmitting and receiving antenna 2 by the tsunami simulation of FIG. 5 and FIG. 6 was illustrated, where the arrival time of the tsunami 7 occurred at time when the water level became a highest water level. In addition, the tsunami 7 was assumed to be detected at a time point when the distance from the transmitting and receiving antenna 2 was 45 kilometers. Referring to FIG. 11, it can be understood that the tsunami 7 arrives at the installation position of the transmitting and receiving antenna 2 twelve minutes after being detected by the tsunami monitoring system 1B.

Figure 12:
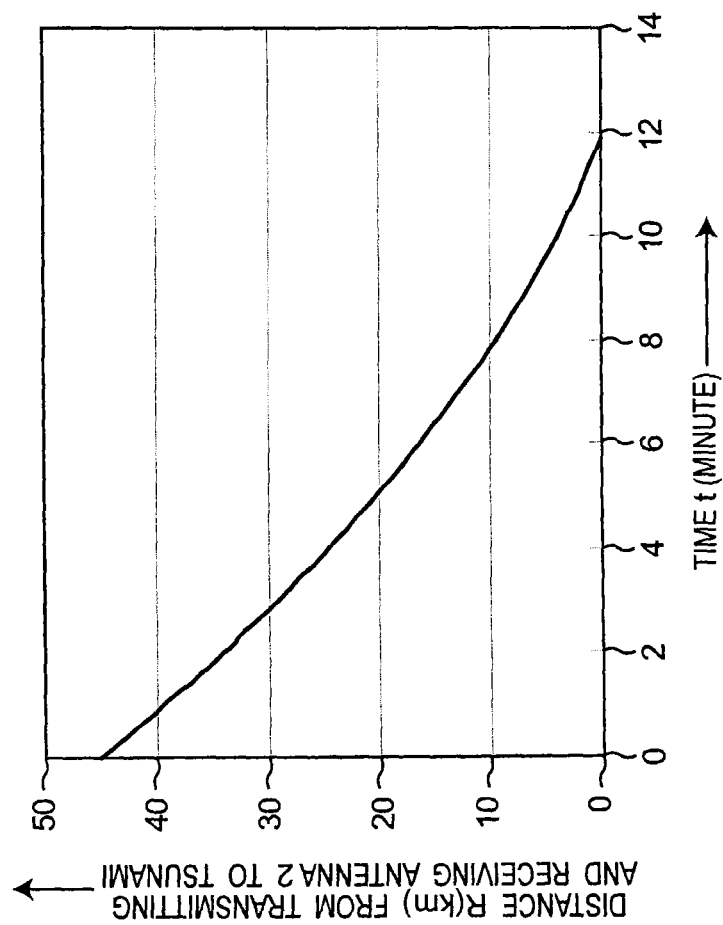
FIG. 12 is a graph that predicts time until when the tsunami 7 arrives at the transmitting and receiving antenna 2 by using the tsunami monitoring system 1B of FIG. 9.

FIG. 12 is a graph that predicts time until when the tsunami 7 arrives at the transmitting and receiving antenna 2 by using the tsunami monitoring system 1B of FIG. 9. In this case, the wave velocity C of the tsunami 7 at each position of the aforementioned radio wave radiation region 14 is calculated, and the time at which the distance between the tsunami 7 and the transmitting and receiving antenna 2 becomes zero is the predicted arrival time. In FIG. 12, it can be understood that the predicted arrival time is twelve minutes, which approximately coincides with the actual arrival time of FIG. 11, and that highly accurate prediction is possible.

It is noted that the tsunami 7 propagates faster as the water depth is deeper, and the tsunami 7 possibly arrives approximately from all directions. Therefore, the tsunami 7 detected first by the tsunami monitoring system 1B does not always arrive earlier at the installation position of the transmitting and receiving antenna 2, and therefore, prediction by the arrival predictor portion 12 is executed for all the regions in the direction of the rotational angle θ of the radio wave radiation region 14, and safe prediction is enabled by assuming the shortest predicted arrival time to be the predicted arrival time of the tsunami 7.

Next, prediction of the arrival wave height in the arrival predictor portion 12 is described.

When the propagation velocity becomes slower as the offshore tsunami 7 comes to be closer to the shallow coastal area, the front portion of the tsunami 7 starts delaying, and the hind portion catches up with it, consequently increasing the wave height η. The wave height η of the tsunami 7 generally increases in inverse proportion to the biquadratic root of the static water depth h according to the following Green's formula (13) (see Non-Patent Literature 3):

$$\eta_0 h_0^{1/4} = \text{cons tan } t \qquad (13)$$

In this case, $\eta_0$ is the arrival wave height of the tsunami 7, and $h_0$ is the static water depth at a predetermined distance from the installation position of the transmitting and receiving antenna 2. That is, the wave height η at the time of arrival to the transmitting and receiving antenna 2 can be generally predicted from wave height η of the offshore detected tsunami 7 and the static water depth h at the detection position. However, since the static water depth h is zero at the installation position of the transmitting and receiving antenna 2, the value of the wave height η of the tsunami 7 disadvantageously becomes infinite if this value is substituted into the equation (13). Accordingly, it is assumed that the static water depth is $h_0$ at the point of time when the tsunami 7 arrives at a predetermined distance from the installation position of the transmitting and receiving antenna 2, and the wave height η of the tsunami 7 at the time point is the arrival wave height $\eta_0$. In this case, the predetermined distance, which varies depending on the installation position of the transmitting and receiving antenna 2 and the distribution of the circumjacent static water depth h, is normally one kilometer to several kilometers. In addition, the distribution of the estimated wave height η is updated every sample time Δt. That is, these predicted values are updated to the latest data, improving the prediction accuracy.

According to the tsunami monitoring system 1B of the above embodiment, the arrival predictor portion 12 is further provided by comparison to the tsunami monitoring system 1A of the second embodiment, and therefore, it is possible to more accurately predict the arrival time and the arrival wave height of the tsunami.

Fifth Embodiment

In the fourth embodiment, the arrival time and the arrival wave height of the tsunami 7 were predicted by using the modeled equation (12) and equation (13) in the arrival predictor portion 12. In contrast to this, in the present embodiment, the arrival time and the arrival wave height of the tsunami 7 can be further improved by executing a tsunami simulation on the basis of the distribution of the wave height η of the tsunami 7 estimated by a wave height estimator portion 11C in the sectorial radio wave radiation region 14, and predicting the arrival time and the arrival wave height of the tsunami 7 on the basis of the obtained simulation results.

Figure 13:
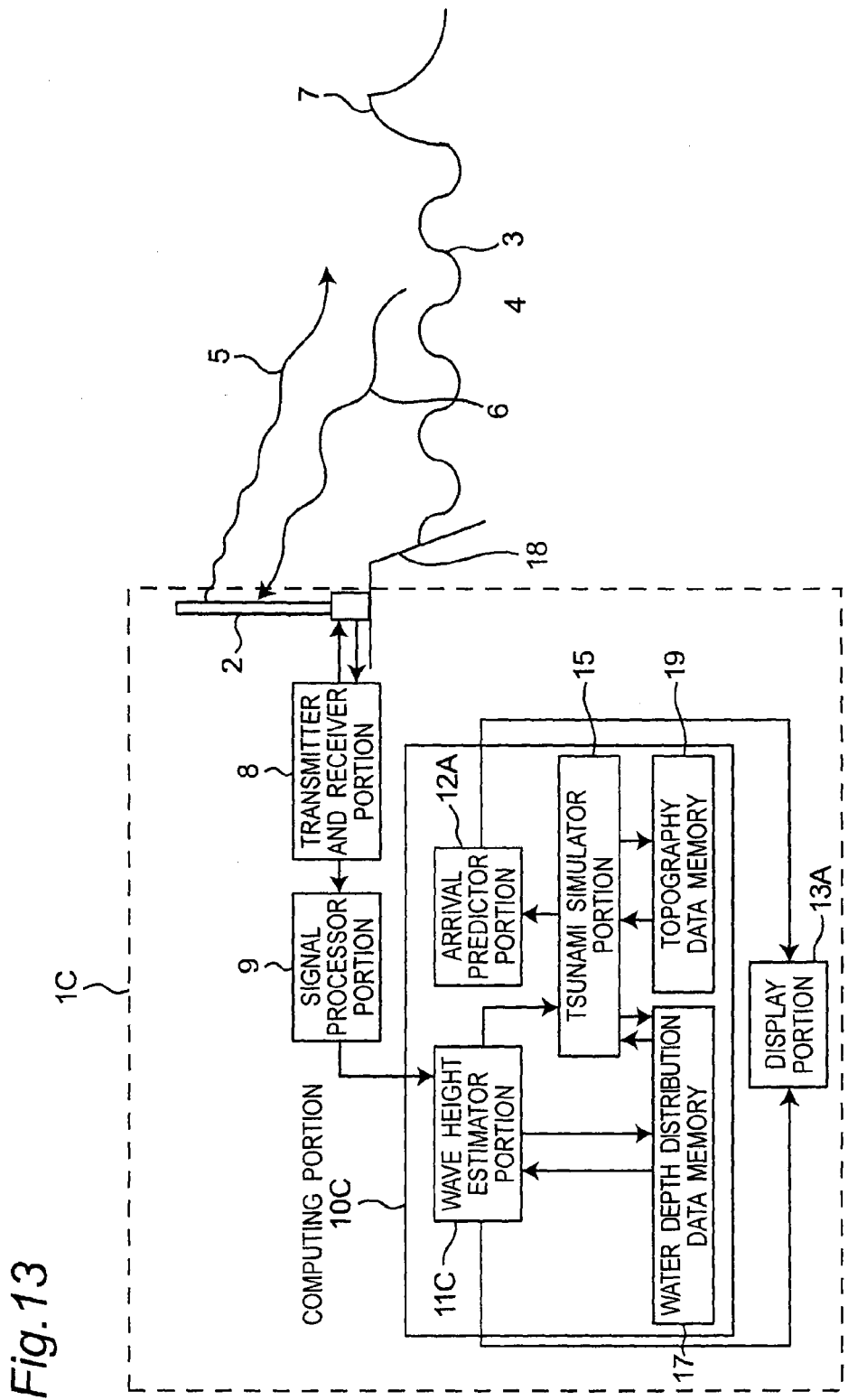
FIG. 13 is a block diagram showing a tsunami monitoring system 1C and its peripheral components, according to a fifth embodiment of the present invention.

FIG. 13 is a block diagram showing a tsunami monitoring system 1C according to the fifth embodiment of the present invention and its peripheral components. As compared with the tsunami monitoring system 1B of FIG. 9, the tsunami monitoring system 1C of FIG. 13 is characterized in that a computing portion 10C is provided in place of the computing portion 10B. In addition, as compared with the computing portion 10B, the computing portion 10C is characterized in that a wave height estimator portion 11C is provided in place of the wave height estimator portion 11B, an arrival predictor portion 12A is provided in place of arrival predictor portion 12, and a tsunami simulator portion 15 and a topography data memory 19 that is the second memory to store topography data are further provided.

Referring to FIG. 13, the wave height estimator portion 11C receives a beat signal from the signal processor portion 9, calculates the flow velocity of the sea surface 3 of the tsunami 7 on the basis of the beat signal, estimates the wave height η of the tsunami 7 on the basis of this flow velocity and the distribution data of the static water depth h of the sea 4 stored in the water depth distribution data memory 17, and outputs the data of the estimated wave height η to the display portion 13A and the tsunami simulator portion 15.

The tsunami simulator portion 15 receives an input of the data of the wave height η of the tsunami 7 from the wave height estimator portion 11C, performs a simulation of the distribution of the wave height η of the tsunami 7 propagating in accordance with a lapse of time on the basis of the data of the wave height η, the distribution data of the water depth h stored in the water depth distribution data memory 17 and the topography data stored in the topography data memory 19, and outputs the simulation results to the arrival predictor portion 12A. In this case, as initial conditions for simulating the behavior of the tsunami 7 propagating in accordance with a lapse of time, there is setting such that a tsunami 7 having a distribution of the wave height η estimated in the wave height estimator portion 11C is generated in the region 40 illustrated by the hatched area of FIG. 14A as described below. In addition, the aforementioned topography data is the position information of the coastline necessary for executing the tsunami simulation. The range of this coastline, which differs depending on the range where the tsunami simulation is performed, is generally regarded to be several tens of kilometers square to several hundreds of kilometers square from the transmitting and receiving antenna 2. It is noted that although the tsunami simulation is executed by using the primitive equation of tsunami based on the long-wave theory described in, for example, Non-Patent Literature 2, as described in the third embodiment, any method may be used so long as the wave height η in the entire region of the radio wave radiation region 14 of FIG. 14A as described below can be obtained by solving the primitive equation of tsunami.

The arrival predictor portion 12A receives an input of the wave height distribution data of the tsunami 7 simulated by the tsunami simulator portion 15, predicts the arrival time and the arrival wave height with regard to the tsunami 7 on the basis of the wave height distribution data, and outputs the data of the predicted arrival time and arrival wave height to the display portion 13A. That is, the arrival time and the arrival wave height of the tsunami 7 are predicted by calculating the time variation of the water level at the installation position of the transmitting and receiving antenna 2 from the tsunami simulation results.

The display portion 13A displays the data of the wave height inputted from the wave height estimator portion 11C and the data of the predicted arrival time and arrival wave height inputted from the arrival predictor portion 12A.

Next, the operation of the tsunami simulator portion 15 is described below.

Figure 14A:
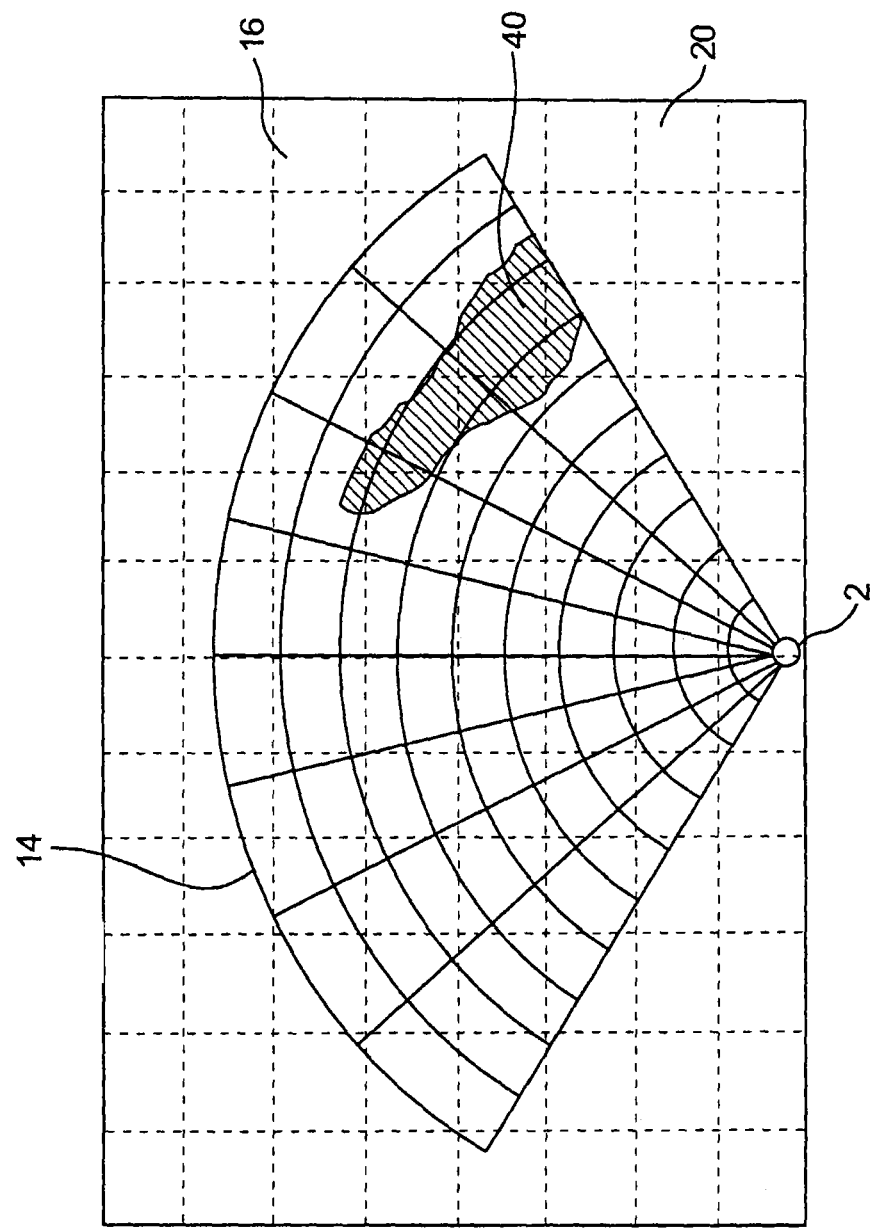
FIG. 14A is a plan view for explaining a region in which a tsunami simulator portion 15 of FIG. 13 simulates a behavior of the propagating tsunami 7.

FIG. 14A is a plan view for explaining a region in which the tsunami simulator portion 15 of FIG. 13 simulates the behavior of the propagating tsunami 7. Referring to FIG. 14A, a tsunami simulation region 16 is provided, and computational grids for the tsunami simulation are formed. The size and shape of the tsunami simulation region 16 may be any size and shape, and a size equivalent to or larger than the radio wave radiation region 14 is generally used. In addition, the coordinate system of the formed computational grids may be any coordinate system, and the orthogonal coordinate system or the cylindrical coordinate system is generally used. Further, the dimensions of an evaluation region 20 formed by the computational grids, which may have any size and shape, are generally set not larger than several kilometers square since the accuracy of the tsunami simulation deteriorates when the dimensions are too large.

Next, as initial conditions for simulating the wave height $\eta$ of the tsunami 7 propagating in accordance with a lapse of time, the simulation is executed by setting a wave height distribution estimated by the wave height estimator portion 11C in a region 40 inside the tsunami simulation region 16 of FIG. 14A.

Figure 14B:
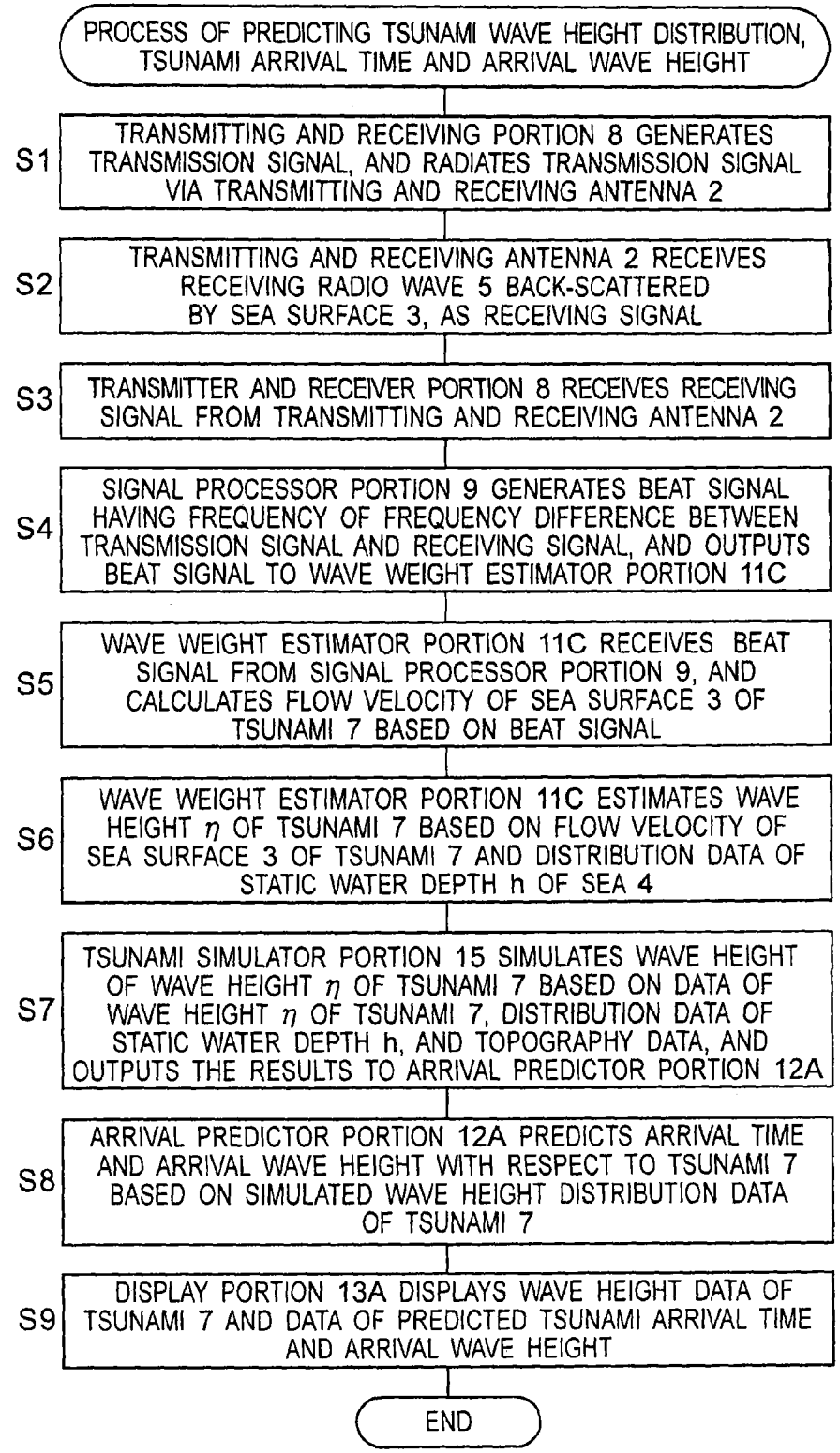
FIG. 14B is a flow chart showing process of predicting tsunami wave height distribution and tsunami arrival time and arrival wave height executed by the tsunami monitoring system 1C of FIG. 13.

FIG. 14B is a flow chart showing a process of predicting tsunami wave height distribution, and a tsunami arrival time and an arrival wave height executed by the tsunami monitoring system 1C of FIG. 13. In step S1 of FIG. 14B, the transmitter and receiver portion 8 generates a transmission signal having a predetermined frequency, and radiates the transmission signal as a transmission radio wave 5 onto the sea. Next, the transmitting and receiving antenna 2 receives a receiving radio wave 6 intensely back-scattered on the sea surface 3 as a receiving signal (step S2). In step S4, the signal processor portion 9 generates a beat signal that has a frequency of a frequency difference between the transmission signal and the receiving signal, and outputs the generated beat signal to the wave height estimator portion 11C. In step S5, the wave height estimator portion 11C receives the beat signal from the signal processor portion 9, calculates the flow velocity of the sea surface 3 of the tsunami 7 on the basis of the beat signal, and estimates the wave height $\eta$ of the tsunami 7 from this flow velocity.

In step S7, the tsunami simulator portion 15 receives an input of the data of the wave height $\eta$ of the tsunami 7 from the wave height estimator portion 11C, simulates the wave height distribution of the wave height $\eta$ of the tsunami 7 on the basis of the data of the wave height $\eta$, the distribution data of the static water depth h stored in the water depth distribution data memory 17 and the topography data stored in the topography data memory 19, and outputs the results to the arrival predictor portion 12A. Next, in step S8, the arrival predictor portion 12A predicts the arrival time and the arrival wave height of the tsunami 7 on the basis of the simulated wave height distribution data of the tsunami 7. In step S9, the display portion 13A displays the wave height data of the tsunami 7 and the data of the predicted tsunami arrival time and arrival wave height, and this process terminates.

In addition, it is acceptable to consistently execute the tsunami simulation on the basis of the estimated wave height distribution in the tsunami simulator portion 15 or to execute the tsunami simulation only in the case where the estimated wave height is a wave height determined as tsunami. In this case, a tsunami is determined when, for example, the estimated wave height, the magnitude of the measured flow velocity or the like exceeds a predetermined threshold value. It is noted that the threshold value is preparatorily decided in consideration of the height of waves generated by the wind and the ocean current, measurement errors of the flow velocity distribution and so on in the sea area where the tsunami monitoring system 1C is installed.

It is noted that the tsunami simulation is executed by using the primitive equation of tsunami based on the long-wave theory of, for example, the method as described in Non-Patent Literature 2. In addition, any method may be used so long as the wave height $\eta$ in the entire region of the radio wave radiation region 14 of FIG. 14A can be obtained by solving the primitive equation of tsunami, and the method of, for example, the difference method, the finite volume method, or the finite element method may be used. Further, it is acceptable to simplify or linearize the primitive equation on the assumption that the static water depth h is sufficiently large as described above.

It is noted that the aforementioned tsunami simulation may be set so as to be executed immediately after the detection of the tsunami 7 by the wave height estimator portion 11C or may be executed every measurement sample period $\Delta t$ by the tsunami monitoring system 1C. In this case, it becomes possible to perform momentarily updating to the latest data every sample period $\Delta t$, and therefore, it is possible to further improve the accuracy of the simulation. In addition, although only the data of the estimated wave height $\eta$ is used as the initial conditions for performing the simulation of the tsunami 7 propagating in accordance with a lapse of time, further measured velocity distribution data may be used.

According to the tsunami monitoring system 1C of the above embodiment, as compared with the tsunami monitoring system 1A and 1C of the aforementioned embodiments, a complicated tsunami behavior such as reflection of tsunami at the seacoast can be further considered and therefore, it is possible to more accurately predict the arrival time and the arrival wave height of the tsunami.

Sixth Embodiment

In the tsunami monitoring system 1C of the fifth embodiment, the tsunami simulator portion 15A has predicted the arrival time and the arrival wave height of the tsunami 7 in cooperation with the arrival predictor portion 12A on the basis of the wave height distribution of the tsunami 7 estimated by the wave height estimator portion 11C. However, all these operations may be executed by only the tsunami simulator portion 15A. This is described below. FIG. 15 is a block diagram showing a tsunami monitoring system 1D and its peripheral components, according to a sixth embodiment of the present invention. As compared with the tsunami monitoring system 1C of FIG. 13, the tsunami monitoring system 1D of FIG. 15 is characterized in that a computing portion 10D is provided in place of the computing portion 10C. In addition, as compared with the computing portion 10C of FIG. 13, the computing portion 10D is characterized in that the wave height estimator portion 11C and the arrival predictor portion 12A are eliminated, and a tsunami simulator portion 15A is provided in place of the tsunami simulator portion 15.

The tsunami simulator portion 15A receives a beat signal from the signal processor portion 9, calculates the flow velocity of the sea surface 3 on the basis of the beat signal, and estimates the wave height $\eta$ of the tsunami 7 on the basis of this flow velocity and the distribution data of the static water depth h of the sea 4 stored in the water depth distribution data memory 17. The wave height distribution of the tsunami 7 propagating in accordance with a lapse of time is simulated on the basis of the data of the estimated wave height $\eta$ of the tsunami 7, the distribution data of the static water depth h stored in the water depth distribution data memory 17 and the topography data stored in the topography data memory 19. The arrival time arrival and the arrival wave height of the tsunami 7 are predicted on the basis of the simulation results, and the data of the predicted arrival time and arrival wave height and the data of the calculated wave height $\eta$ are outputted to the display portion 13A.

In this case, as initial conditions for simulating the tsunami 7 propagating in accordance with a lapse of time, there is setting such that the tsunami 7 having the wave height $\eta$ estimated by the tsunami simulator portion 15A is generated in the region 40 illustrated by the hatching lines of FIG. 14A as described above. In addition, the topography data is the position information of the coastline necessary for executing the tsunami simulation, and the range of this coastline, which varies depending on the range in which the tsunami simulation is executed, is generally set to be several tens of kilometers square to several hundreds of kilometers square from the transmitting and receiving antenna 2. It is noted that the tsunami simulation is executed by using the primitive equation of tsunami based on the long-wave theory described in, for example, Non-Patent Literature 2, as described in the third embodiment, any method can be used so long as the wave height $\eta$ in the entire region of the aforementioned radio wave radiation region 14 of FIG. 14A can be obtained by solving the primitive equation of tsunami.

In addition, the operation concerning the tsunami simulation of the tsunami simulator portion 15A is similar to the operation of the tsunami simulator portion 15 of the tsunami monitoring system 1C according to the fifth embodiment.

It is noted that the tsunami simulation is executed by using the primitive equation of tsunami based on the long-wave theory of the method of, for example, Non-Patent Literature 2. In addition, any method may be used so long as the wave height in the entire region of the radio wave radiation region 14 of FIG. 14A can be obtained by solving the primitive equation of tsunami, and the method of, for example, the difference method, the finite volume method or the finite element method may be used. Further, it is acceptable to simplify or linearize the primitive equation on the assumption that the static water depth h is sufficiently large as described above.

It is noted that the aforementioned tsunami simulation may be set so as to be executed immediately after the detection of the tsunami 7 by the tsunami simulator portion 15A or may be executed every measurement sample period $\Delta t$ by the tsunami monitoring system 1D. In this case, it becomes possible to perform momentarily updating to the latest data every sample period $\Delta t$, and therefore, it is possible to further improve the accuracy of the simulation of the behavior of the tsunami 7.

According to the tsunami monitoring system 1D of the above embodiment, it is possible to obtain the same advantageous effects as those of the tsunami monitoring system 1C of the fifth embodiment.

Seventh Embodiment

The tsunami monitoring system 1 of the first embodiment has been described in the case where the wave height of the tsunami 7 is estimated from only the velocity distribution of the sea surface 3 measured by radio waves. In this case, wave height estimation errors are accumulated at a distance away from the transmitting and receiving antenna 2 in the region of FIG. 3. In contrast to this, the tsunami monitoring system 1E of the present embodiment is characterized in that a water level measurement portion 30 for measuring the wave height $\eta$ is further provided, and the data of the estimated wave height $\eta$ at the position where the water level measurement portion 30 is placed is corrected.

Figure 16:
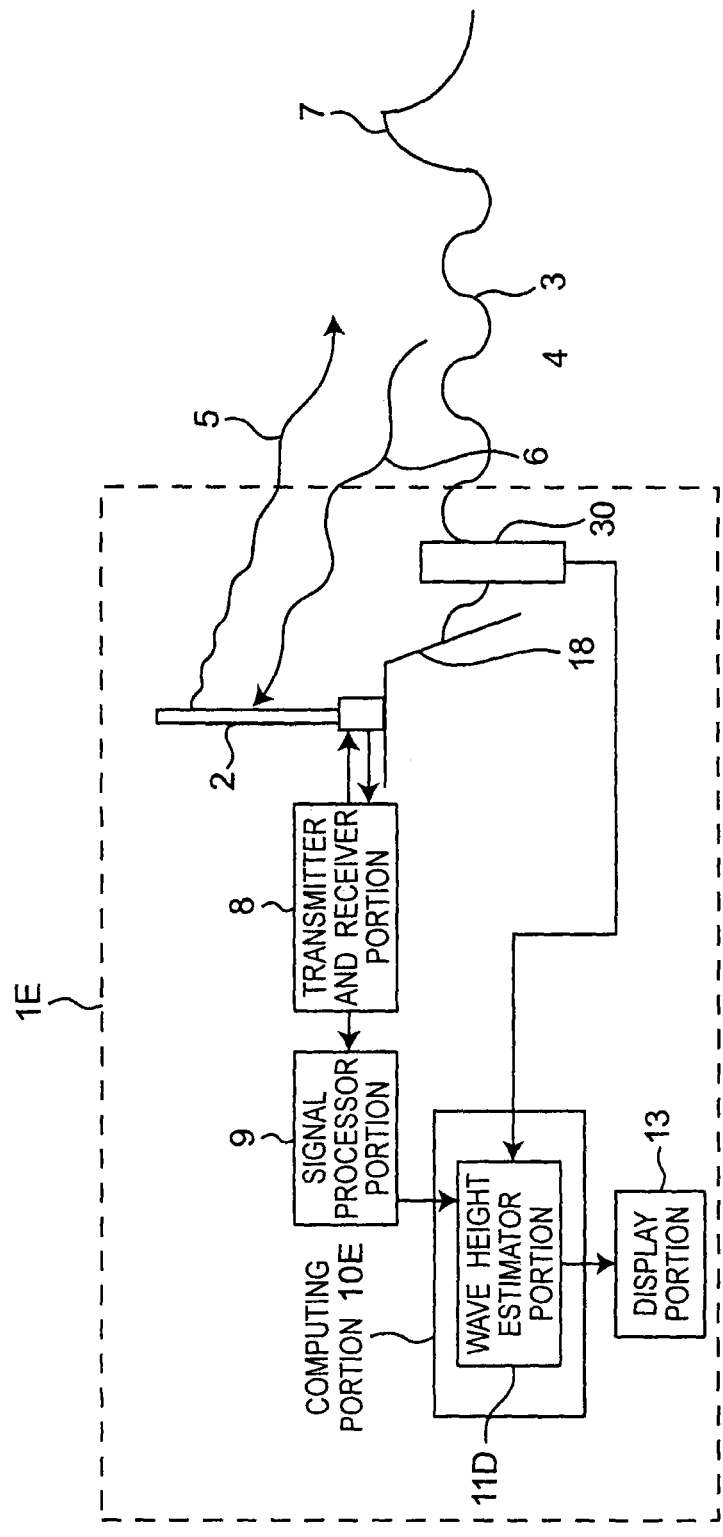
FIG. 16 is a block diagram showing a tsunami monitoring system 1E and its peripheral components, according to a seventh embodiment of the present invention.

FIG. 16 is a block diagram showing a tsunami monitoring system 1E and its peripheral components, according to the seventh embodiment of the present invention. As compared with the tsunami monitoring system 1 of FIG. 1, the tsunami monitoring system 1E of FIG. 16 is characterized in that a computing portion 10E is provided in place of the computing portion 10, and the water level measurement portion 30 placed at an arbitrary position in the radio wave radiation region 14 is further provided. In addition, as compared with the computing portion 10 of FIG. 1, the computing portion 10E is characterized in that a wave height estimator portion 11D is provided in place of the wave height estimator portion 11.

Referring to FIG. 16, the water level measurement portion 30 measures the wave height $\eta$ of the sea 4 at each time at the position where the water level measurement portion 30 is installed, and outputs the data of the wave height $\eta$ to the wave height estimator portion 11D. The wave height estimator portion 11D receives a beat signal from the signal processor portion 9, calculates the flow velocity of the sea surface 3 of the tsunami 7 on the basis of the beat signal, estimates the wave height $\eta$ of the tsunami 7 on the basis of the data of the flow velocity and the data of the wave height $\eta$ from the water level measurement portion 30, and outputs the data of the estimated wave height $\eta$ to the display portion 13.

The operation of the wave height estimator portion 11D of the tsunami monitoring system 1E configured as above is described below.

The wave height estimator portion 11D differs in that the data of the wave height $\eta$ at the position where the water level measurement portion 30 is placed estimated by the equation (6) is corrected on the basis of the data of the wave height $\eta$ measured by the water level measurement portion 30 by comparison to the wave height estimator portion 11 of the first embodiment. A method for correcting the data of the estimated wave height $\eta$ is described below.

Figure 17:
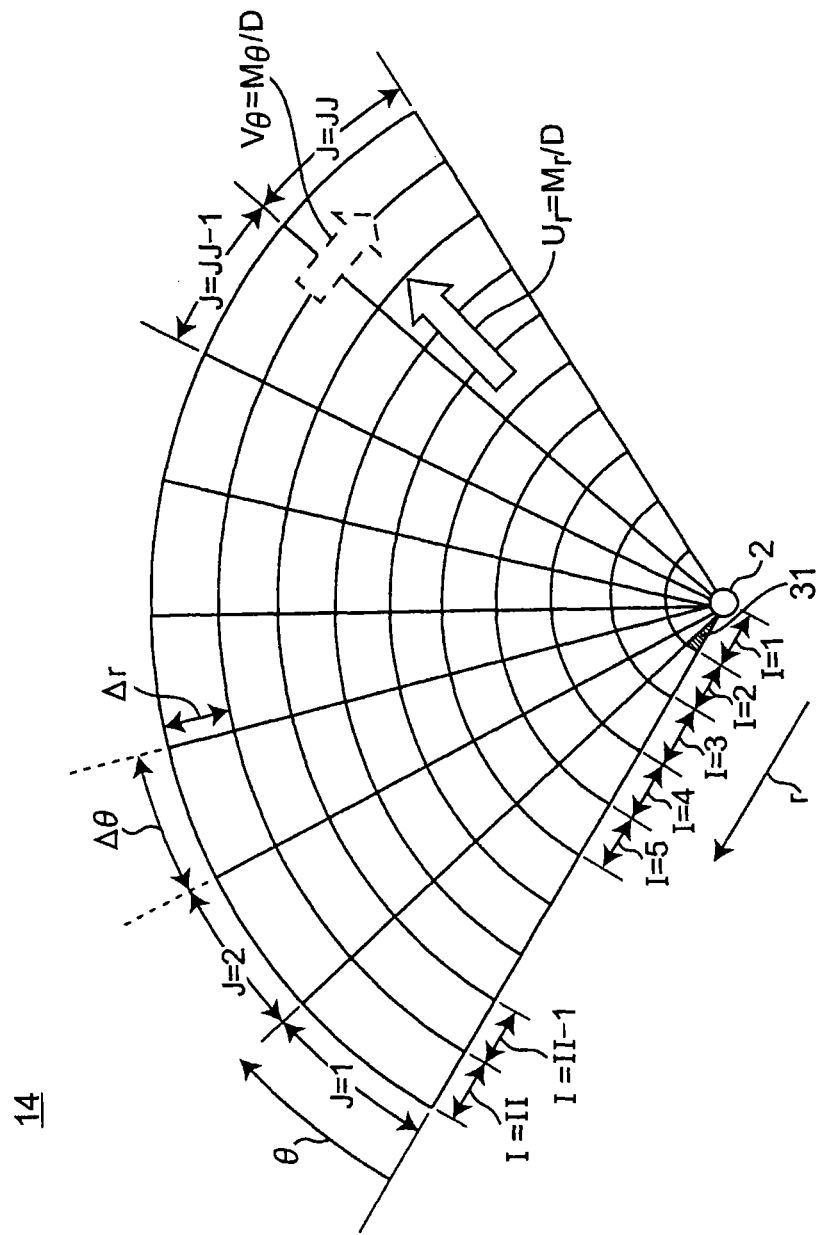
FIG. 17 is a top view showing one example of a placement position of a water level measurement portion 30 in the tsunami monitoring system 1E of the seventh embodiment of the present invention.

FIG. 17 is a top view showing one example of the placement position of the water level measurement portion 30 in the tsunami monitoring system 1E of the present embodiment. In FIG. 17, the water level measurement portion 30 is placed in a region 31 inside the radio wave radiation region 14, and the water level measurement portion 30 measures the wave height $\eta$ of the tsunami 7 in the region 31. Next, the wave heights $\eta$ at the positions I=2, 3, ..., II, J=1 inside the radio wave radiation region 14 are sequentially estimated by using the equation (6) that is the forward difference formula on the basis of the data of the measured wave height $\eta$.

According to the tsunami monitoring system 1E of the above embodiment, it is possible to obtain the same advantageous effects as those of the tsunami monitoring system 1 according to the first embodiment. In addition, even when the wave height of the tsunami in the vicinity of the transmitting and receiving antenna 2 rapidly changes, the data of the wave height η at the position where the water level measurement portion 30 is placed can be corrected by the water level measurement portion 30. Therefore, the wave height of the tsunami can be estimated more accurately by comparison to the tsunami monitoring system 1 of the first embodiment.

In addition, the placement position of the water level measurement portion 30 may be anywhere inside the radio wave radiation region 14, and it is also possible to place the water level measurement portion 30 outside the region illustrated in FIG. 17.

Figure 18:
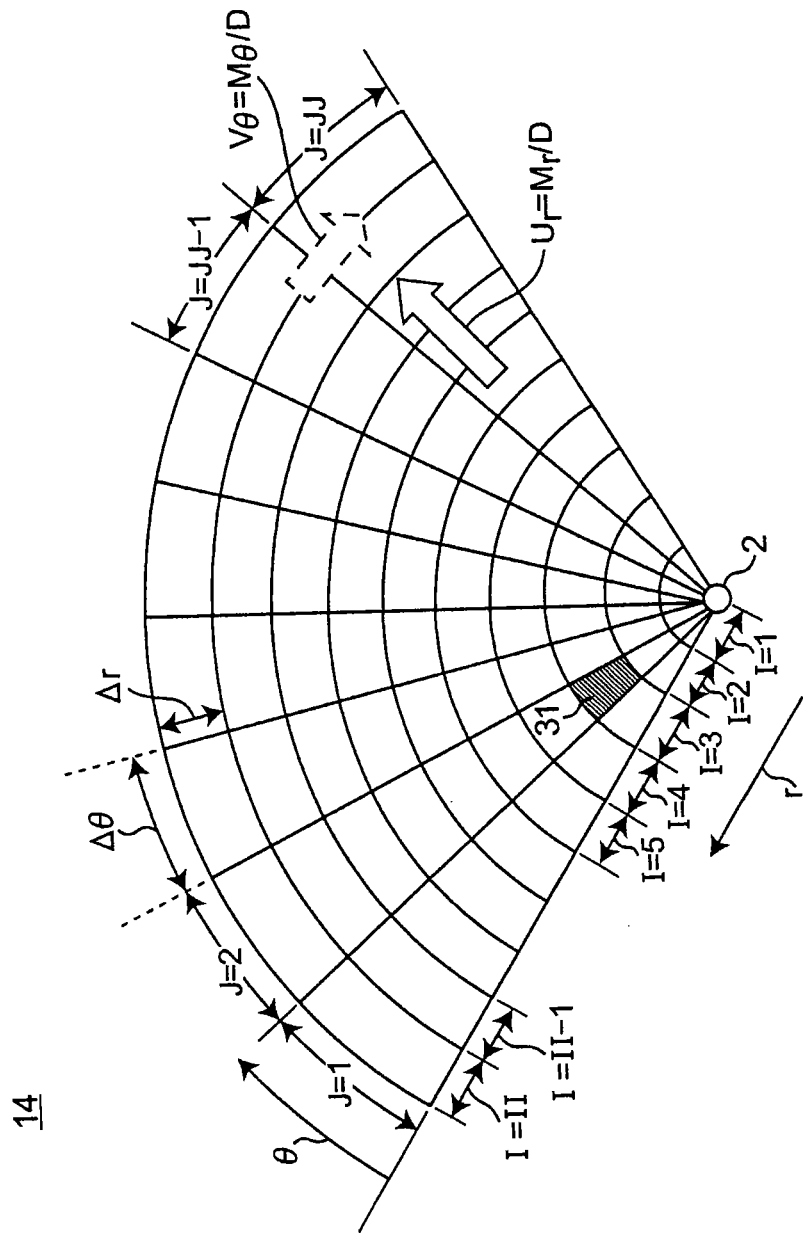
FIG. 18 is a top view showing another example of the placement position of the water level measurement portion 30 in the tsunami monitoring system 1E of the seventh embodiment of the present invention.

FIG. 18 is a top view showing another example of the placement position of the water level measurement portion 30 in the tsunami monitoring system 1E of the seventh embodiment of the present invention. In FIG. 18, the water level measurement portion 30 is placed inside the radio wave radiation region 14, and the water level measurement portion 30 measures the wave height η of the tsunami 7 in the region 31. Next, the wave heights η of the tsunami 7 at the positions of the regions I=4, 5, . . . , II, J=2 inside the radio wave radiation region 14 are sequentially estimated by using the equation (6) that is the forward difference formula on the basis of the data of the wave height η of the tsunami 7 in the region 31 measured by the water level measurement portion 30. In addition, the wave heights η of the tsunami 7 at the positions of the regions I=2, 1, and J=2 inside the radio wave radiation region 14 are sequentially estimated by using the following equation (14) that is the backward difference formula on the basis of the data of the wave height η of the tsunami 7 in the region 31 measured by the water level measurement portion 30:

$$\eta(I, J)^k = \eta(I+1, J) + \left(\frac{\Delta r}{\Delta t}\right)\frac{1}{g}(U_r(I+1, J)^k - U_r(I+1, J)^{k-1}) \quad (14)$$

A tsunami monitoring system in a modified embodiment of the aforementioned seventh embodiment of the present invention has also the same operations and advantageous effects as those of the tsunami monitoring system 1E of the present embodiment.

Eighth Embodiment

The tsunami monitoring system 1A of the second embodiment has been described in the case where the wave height η of the tsunami 7 is estimated from only the velocity distribution of the sea surface 3 measured by radio waves. In this case, wave height estimation errors are accumulated at a distance away from the transmitting and receiving antenna 2 in the region of FIG. 3. In contrast to this, a tsunami monitoring system 1F of the present embodiment is characterized in that a water level measurement portion 30 for measuring the wave height η is further provided, and the data of the estimated wave height η at the position where the water level measurement portion 30 is placed is corrected.

Figure 19:
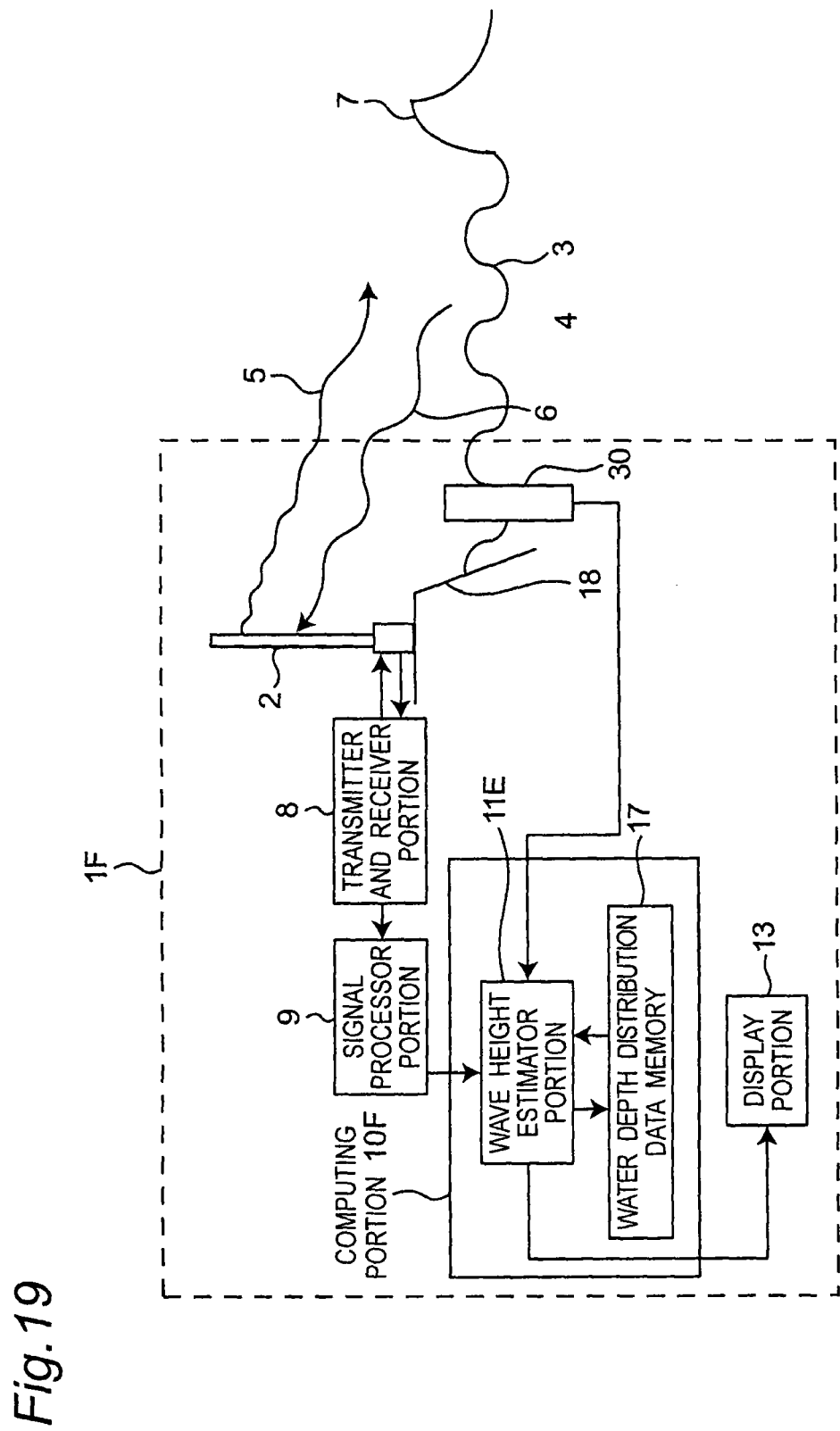
FIG. 19 is a block diagram showing a tsunami monitoring system 1F and its peripheral components, according to an eighth embodiment of the present invention.

FIG. 19 is a block diagram showing a tsunami monitoring system 1F and its peripheral components, according to an eighth embodiment of the present invention. As compared with the tsunami monitoring system 1A of FIG. 4 of the second embodiment, the tsunami monitoring system 1F of FIG. 19 is characterized in that a computing portion 10F is provided in place of the computing portion 10A, and the water level measurement portion 30 placed at an arbitrary position inside the radio wave radiation region 14 is further provided. In addition, as compared with the computing portion 10A of FIG. 4, the computing portion 10F is characterized in that a wave height estimator portion 11E is provided in place of the wave height estimator portion 11A.

Referring to FIG. 19, the water level measurement portion 30 measures the wave height η of the sea 4 at each time at the position where the water level measurement portion 30 is installed, and outputs the data of the wave height η to the wave height estimator portion 11E. The wave height estimator portion 11E receives a beat signal from the signal processor portion 9, calculates the flow velocity of the sea surface 3 of the tsunami 7 on the basis of the beat signal, estimates the wave height η of the tsunami 7 on the basis of the data of the flow velocity, the distribution data of the static water depth h of the sea 4 stored in the water depth distribution data memory 17 and the data of the wave height η from the water level measurement portion 30, and outputs the data of the estimated wave height η to the display portion 13.

The operation of the wave height estimator portion 11E of the tsunami monitoring system 1F configured as above is described below.

The wave height estimator portion 11E operates similarly to the wave height estimator portion 11A of the second embodiment, and differs in that the data of the wave height η at the position where the water level measurement portion 30 is placed estimated by the equation (7) is corrected on the basis of the data of the wave height η of the tsunami 7 measured by the water level measurement portion 30 by comparison to the wave height estimator portion 11A of the second embodiment.

According to the tsunami monitoring system 1F of the above embodiment, it is possible to obtain the same advantageous effects as those of the tsunami monitoring system 1 of the first embodiment. In addition, even when the wave height of the tsunami in the vicinity of the transmitting and receiving antenna 2 rapidly changes, the data of the wave height η at the position where the water level measurement portion 30 is placed can be corrected by the water level measurement portion 30. Therefore, the wave height of the tsunami can be estimated more accurately by comparison to the tsunami monitoring system 1 of the first embodiment.

Ninth Embodiment

The tsunami monitoring system 1B of the fourth embodiment has been described in the case where the wave height η of the tsunami 7 is estimated from only the velocity distribution of the sea surface 3 measured by radio waves. In this case, wave height estimation errors are accumulated at a distance away from the transmitting and receiving antenna 2 in the region of FIG. 3. In contrast to this, the tsunami monitoring system 1F of the present embodiment is characterized in that the water level measurement portion 30 for measuring the wave height η is further provided, and the data of the estimated wave height η at the position where the water level measurement portion 30 is placed is corrected.

Figure 20:
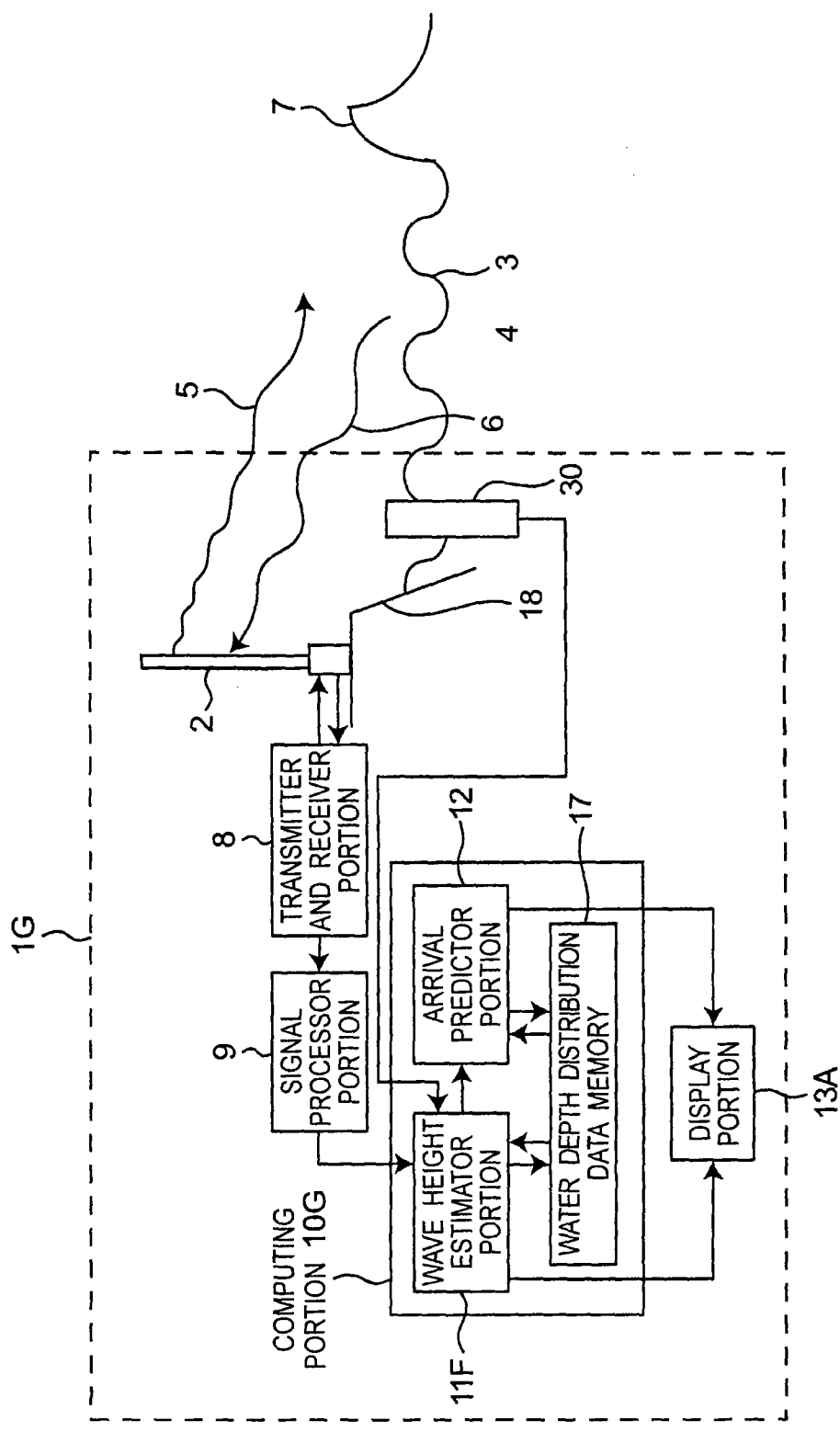
FIG. 20 is a block diagram showing a tsunami monitoring system 1G and its peripheral components, according to a ninth embodiment of the present invention.

FIG. 20 is a block diagram showing a tsunami monitoring system 1G and its peripheral components, according to a ninth embodiment of the present invention. As compared with the tsunami monitoring system 1B of FIG. 9, the tsunami monitoring system 1G of FIG. 20 is characterized in that a computing portion 100 is provided in place of the computing portion 10B, and the water level measurement portion 30 placed at an arbitrary position inside the radio wave radiation region 14 is further provided. In addition, as compared with the computing portion 10B of FIG. 9, the computing portion 10G is characterized in that a wave height estimator portion 11F is provided in place of the wave height estimator portion 11B.

Referring to FIG. 20, the water level measurement portion 30 measures the wave height η of the sea 4 at each time at the position where the water level measurement portion 30 is installed, and outputs the data of the wave height η to the wave height estimator portion 11F. The wave height estimator portion 11F receives a beat signal from the signal processor portion 9, calculates the flow velocity of the sea surface 3 of the tsunami 7 on the basis of the beat signal, estimates the wave height η of the tsunami 7 on the basis of the flow velocity data, the distribution data of the static water depth h of the sea 4 stored in the water depth distribution data memory 17 and the data of the wave height η from the water level measurement portion 30, and outputs the data of the estimated wave height η to the display portion 13 and the arrival predictor portion 12.

The operation of the wave height estimator portion 11F of the tsunami monitoring system 1G configured as above is described below.

The wave height estimator portion 11F operates similarly to the wave height estimator portion 11B of the fourth embodiment, and differs in that the data of the estimated wave height η at the position where the water level measurement portion 30 is placed is corrected on the basis of the data of the wave height η at the position where the water level measurement portion 30 is placed by comparison to the wave height estimator portion 11B of the fourth embodiment.

According to the tsunami monitoring system 1G of the above embodiment, it is possible to obtain the same advantageous effects as those of the tsunami monitoring system 1B of the fourth embodiment. In addition, even when the wave height of the tsunami in the vicinity of the transmitting and receiving antenna 2 rapidly changes, the data of the wave height η at the position where the water level measurement portion 30 is placed can be corrected by the water level measurement portion 30. Therefore, the wave height of the tsunami can be estimated more accurately by comparison to the tsunami monitoring system 1B of the fourth embodiment.

Tenth Embodiment

The tsunami monitoring system 1C of the fifth embodiment has been described in the case where the wave height η of the tsunami 7 is estimated from only the velocity distribution of the sea surface 3 measured by radio waves. In this case, wave height estimation errors are accumulated at a distance away from the transmitting and receiving antenna 2 in the region of FIG. 3. In contrast to this, the tsunami monitoring system 1H of the present embodiment is characterized in that the water level measurement portion 30 to measure the wave height η is further provided, and the data of the estimated wave height η at the position where the water level measurement portion 30 is placed is corrected.

Figure 21:
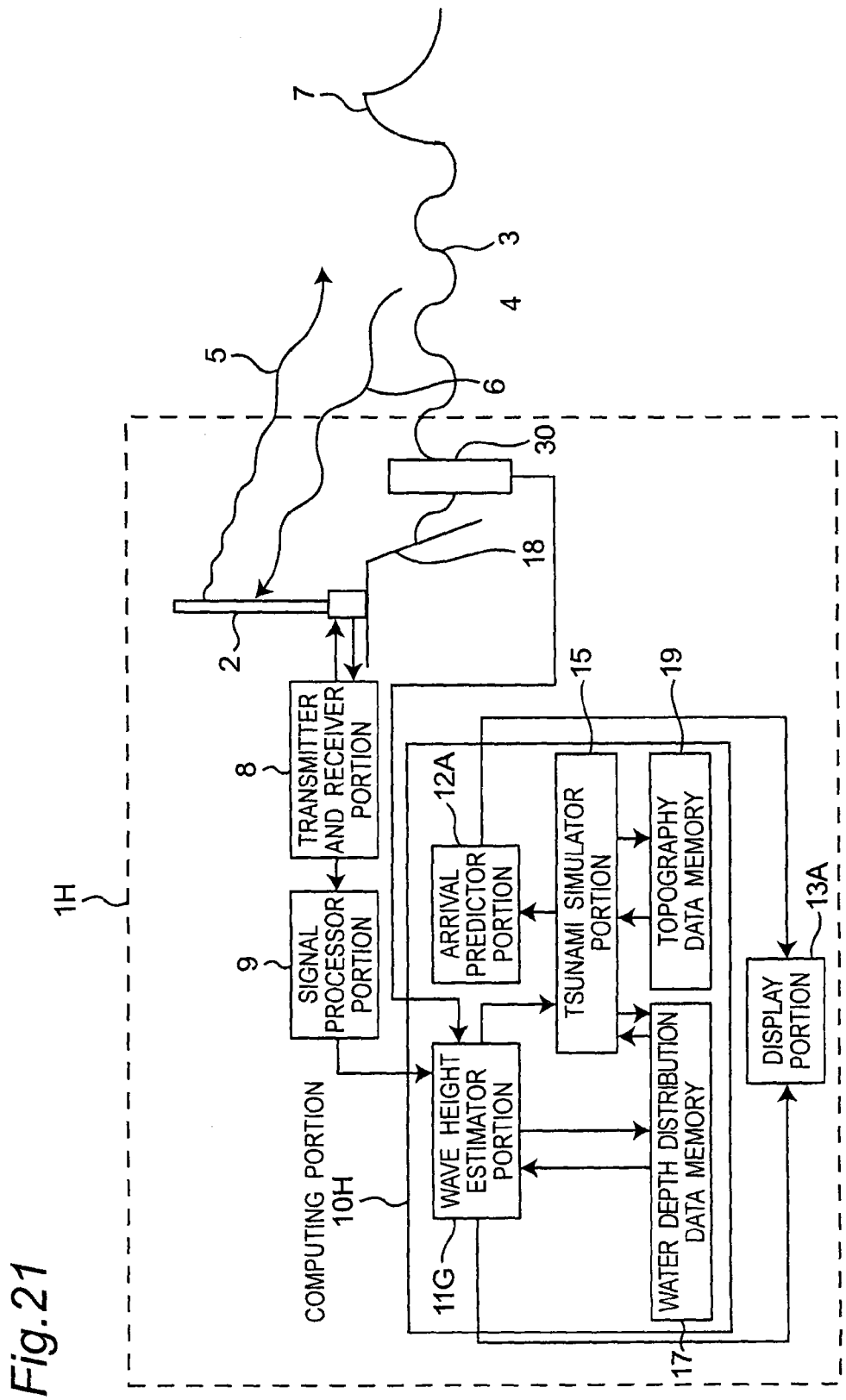
FIG. 21 is a block diagram showing a tsunami monitoring system 1H and its peripheral components, according to a tenth embodiment of the present invention.

FIG. 21 is a block diagram showing a tsunami monitoring system 1H and its peripheral components, according to a tenth embodiment of the present invention. As compared with the tsunami monitoring system 1C of FIG. 13, the tsunami monitoring system 1H of FIG. 21 is characterized in that a computing portion 10H is provided in place of the computing portion 10C, and the water level measurement portion 30 placed at an arbitrary position inside the radio wave radiation region 14 is further provided. In addition, as compared with the computing portion 10C of FIG. 13, the computing portion 10H is characterized in that a wave height estimator portion 11G is provided in place of the wave height estimator portion 11C.

Referring to FIG. 21, the water level measurement portion 30 measures the wave height η of the sea 4 at each time at the position where the water level measurement portion 30 is installed, and outputs the data of the wave height η to the wave height estimator portion 11G. The wave height estimator portion 11G receives a beat signal from the signal processor portion 9, calculates the flow velocity of the sea surface 3 of the tsunami 7 on the basis of the beat signal, estimates the wave height η of the tsunami 7 on the basis of the flow velocity data, the distribution data of the static water depth h of the sea 4 stored in the water depth distribution data memory 17 and the data of the wave height η from the water level measurement portion 30, and outputs the data of the estimated wave height η to the display portion 13A and the tsunami simulator portion 15.

The operation of the wave height estimator portion 11G of the tsunami monitoring system 1H configured as above is described below.

The wave height estimator portion 11G operates in a manner similar to that of the wave height estimator portion 11C of the fifth embodiment, and differs in that the data of the estimated wave height η at the position where the water level measurement portion 30 is placed is corrected on the basis of the data of the wave height η at the position where the water level measurement portion 30 is placed by comparison to the wave height estimator portion 11C of the fifth embodiment.

According to the tsunami monitoring system 1H of the above embodiment, it is possible to obtain the same advantageous effects as those of the tsunami monitoring system 1C of the fifth embodiment. In addition, even when the wave height of the tsunami in the vicinity of the transmitting and receiving antenna 2 rapidly changes, the data of the wave height η at the position where the water level measurement portion 30 is placed can be corrected by the water level measurement portion 30. Therefore, the wave height of the tsunami can be estimated more accurately by comparison to the tsunami monitoring system 10 of the fifth embodiment.

In each of the aforementioned seventh to tenth embodiments, the water level measurement portion 30 may be provided by any means so long as the local wave height of the sea 4 can be measured in real time, such as a system to measure the wave height by a pressure sensor placed at the sea bottom or to radiate radio waves in spots besides the system floating on the sea 4 like a buoy. Naturally, the water level measurement portion 30 may be placed not in one place but in a plurality of places in the radio wave radiation region 14. By the placement in a plurality of places, the wave height distribution can be predicted more accurately than in the case of one place.

INDUSTRIAL APPLICABILITY

According to the tsunami monitoring system of the present invention, the wave height of the tsunami can be directly predicted from the flow velocity distribution of the sea surface measured by the radio wave, and therefore, it is possible to highly accurately predict the arrival time and the arrival wave height of all tsunamis including unexpected tsunami.

The invention claimed is:

1. A tsunami monitoring radar system comprising:
a transmitting antenna that radiates a transmission signal to detect a tsunami as a radio wave toward a sea;
a receiving antenna that receives reflected waves reflected by the tsunami as a receiving signal;
a signal generator circuit that generates the transmission signal having a predetermined frequency;
a signal processor portion that generates a beat signal of a frequency difference between the transmission signal and the receiving signal; and
a wave height estimator portion that divides a radio wave radiation region into a plurality of regions, calculates a flow velocity of a sea surface of the tsunami for each region on the basis of the beat signal, and estimates a wave height of the tsunami from the calculated flow velocity.

2. The tsunami monitoring radar system as claimed in claim 1, further comprising:
an arrival predictor portion that predicts an arrival time and an arrival wave height with respect to the tsunami on the basis of the wave height of the tsunami.

3. The tsunami monitoring radar system as claimed in claim 2,
wherein the arrival predictor portion calculates the arrival wave height by the following equation:

$$\eta_0 h_0^{1/4} = \text{cons tan } t$$

where $\eta_0$ is the arrival wave height of the tsunami, and $h_0$ is a static water depth at a predetermined distance from an installation position of the transmitting and receiving antennas.

4. The tsunami monitoring radar system as claimed in claim 1, further comprising:
a tsunami simulator portion that executes a tsunami simulation of a behavior of the tsunami on the basis of the estimated wave height of the tsunami.

5. The tsunami monitoring radar system as claimed in claim 1,
wherein the wave height estimator portion calculates the wave height of the tsunami by the following equation:

$$\frac{\partial \eta}{\partial r} = -\frac{1}{g}\frac{\partial U_r}{\partial t}$$

where r is a radius centered on the transmitting antenna, $\eta$ is the wave height of the tsunami, t is a time, and $U_r$ is a flow velocity in a direction of the radius r.

6. The tsunami monitoring radar system as claimed in claim 1,
wherein the wave height estimator portion calculates the wave height of the tsunami by the following equation:

$$\frac{\partial \eta}{\partial r} = \frac{1}{gh}\left\{-\frac{\partial}{\partial r}\left(\frac{M_r^2}{h}\right) - \frac{gn^2}{h^{\frac{7}{3}}}M_r^2 - \frac{\partial M_r}{\partial t}\right\}$$

where r is a radius centered on the transmitting antenna, $\eta$ is the wave height of the tsunami, h is a static water depth of the sea, g is a gravitational acceleration, $M_r$ is a linear flow amount in a direction of the radius r, and n is a sea bottom friction coefficient.

7. The tsunami monitoring radar system as claimed in claim 1,
wherein the wave height estimator portion calculates the wave height of the tsunami by the following equation:

$$\eta = U_r\sqrt{\frac{h}{g}}$$

where $\eta$ is the wave height of the tsunami, h is a static water depth of the sea, g is a gravitational acceleration, and $U_r$ is a flow velocity in a direction of the radius r.

8. The tsunami monitoring radar system as claimed in claim 1,
wherein the wave height estimator portion calculates the wave height of the tsunami by the following equation:

$$\frac{\partial^2 \eta}{\partial r^2} + \frac{1}{r^2}\frac{\partial^2 \eta}{\partial \theta^2} + \frac{1}{h}\left(\frac{\partial h}{\partial r}\frac{\partial \eta}{\partial r} + \frac{1}{r^2}\frac{\partial h}{\partial \theta}\frac{\partial \eta}{\partial \theta}\right) = -\frac{1}{gh}\left\{\frac{\partial}{\partial r}\left(\frac{\partial M_r}{\partial t}\right) + \frac{1}{r}\frac{\partial}{\partial \theta}\left(\frac{\partial M_\theta}{\partial t}\right)\right\}$$

where r is a radius centered on the transmitting and receiving antenna, θ is a clockwise rotational angle centered on the transmitting antenna, $\eta$ is the wave height of the tsunami, h is a static water depth of the sea, $M_r$ is a linear flow amount in a direction of the radius r, $M_\theta$ is a linear flow amount in the direction of the rotational angle θ, g is a gravitational acceleration, and t is a time.

9. The tsunami monitoring radar system as claimed in claim 1,
wherein the wave height estimator portion calculates the wave height of the tsunami by the following equation:

$$\frac{\partial^2 \eta}{\partial r^2} + \frac{1}{h}\left(\frac{\partial h}{\partial r}\frac{\partial \eta}{\partial r}\right) = -\frac{1}{gh}\left\{\frac{\partial}{\partial r}\left(\frac{\partial M_r}{\partial t}\right)\right\}$$

where r is a radius centered on the transmitting antenna, $\eta$ is the wave height of the tsunami, h is a static water depth of the sea, $M_r$ is a linear flow amount in a direction of the radius r, g is a gravitational acceleration, and t is a time.

10. The tsunami monitoring radar system as claimed in claim 6, further comprising:
a memory that stores distribution data of the static water depth h in the sea, and
wherein the wave height estimator portion estimates the wave height of the tsunami on the basis of the distribution data of the static water depth h stored in the memory.

11. The tsunami monitoring radar system as claimed in claim 1, further comprising:
a water level measurement portion that measures the wave height,
wherein the wave height estimator portion estimates the wave height of the tsunami on the basis of data of the wave height of the tsunami measured by a water level measurement portion.

* * * * *